United States Patent
Bouzid et al.

(10) Patent No.: US 10,009,463 B2
(45) Date of Patent: *Jun. 26, 2018

(54) MULTI-CHANNEL DELIVERY PLATFORM

(71) Applicant: Genesys Telecommunications Laboratories, Inc., Daly City, CA (US)

(72) Inventors: Ahmed Tewfik Bouzid, McLean, VA (US); Praphul Kumar, Falls Church, VA (US); Michael T. Mateer, South Riding, VA (US); David James Rennyson, Centreville, VA (US)

(73) Assignee: GENESYS TELECOMMUNICATIONS LABORATORIES, INC., Daly City, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/289,910

(22) Filed: Oct. 10, 2016

(65) Prior Publication Data

US 2017/0118338 A1 Apr. 27, 2017

Related U.S. Application Data

(63) Continuation of application No. 14/453,113, filed on Aug. 6, 2014, now Pat. No. 9,468,040, which is a
(Continued)

(51) Int. Cl.
*H04M 3/00* (2006.01)
*H04M 3/51* (2006.01)

(52) U.S. Cl.
CPC ....... *H04M 3/5166* (2013.01); *H04M 3/5191* (2013.01)

(58) Field of Classification Search
CPC .................. H04M 3/5166; H04M 3/5191
See application file for complete search history.

(56) References Cited

U.S. PATENT DOCUMENTS 5,915,001 A 6/1999 Uppaluru
6,067,357 A 5/2000 Kishinsky et al.
(Continued)

FOREIGN PATENT DOCUMENTS

EP 3047638 A1 2/2017
WO 2011133824 A1 10/2011
WO 2015042345 A1 3/2015

OTHER PUBLICATIONS

Australian Government Patent Examination Report No. 1 for Application No. 2014323444, dated Nov. 18, 2016, 3 pages.
(Continued)

*Primary Examiner* — Simon King
(74) *Attorney, Agent, or Firm* — Lewis Roca Rothgerber Christie LLP

(57) ABSTRACT

A request to execute an interaction site for enabling communications to be exchanged between a multi-channel communications system and a user device is received by an interaction flow processor. The interaction site is identified based on the request. An interaction flow document is accessed for the identified interaction site, the interaction flow document including code for initiating the interaction site between a user device and the multi-channel communications system using any one of multiple different communications channels including an interactive voice response channel. A communications channel used by the user device to contact the multi-channel communications system is determined. Based on the determined communications channel, the code of the interaction flow document is translated to code executable by the multi-channel communications system to enable the multi-channel communications system and the user device to exchange communications over the determined communications channel. A
(Continued)

response is transmitted to the multi-channel communications system.

18 Claims, 13 Drawing Sheets

Related U.S. Application Data continuation of application No. 14/032,443, filed on Sep. 20, 2013, now Pat. No. 8,917,828, which is a continuation-in-part of application No. 13/092,090, filed on Apr. 21, 2011, now Pat. No. 8,654,934.

(60) Provisional application No. 61/326,636, filed on Apr. 21, 2010, provisional application No. 61/326,616, filed on Apr. 21, 2010.

(56) References Cited

U.S. PATENT DOCUMENTS

| | | | |
|---|---|---|---|
| 6,078,652 A | 6/2000 | Barak | |
| 6,263,051 B1 | 7/2001 | Saylor et al. | |
| 6,553,113 B1 | 4/2003 | Dhir et al. | |
| 6,587,547 B1 | 7/2003 | Zirngibl et al. | |
| 6,606,596 B1 | 8/2003 | Zirngibl et al. | |
| 6,658,093 B1 | 12/2003 | Langseth et al. | |
| 6,659,083 B2 | 12/2003 | Gaessler et al. | |
| 6,763,104 B1 | 7/2004 | Judkins et al. | |
| 6,765,997 B1 | 7/2004 | Zirngibl et al. | |
| 6,768,788 B1 | 7/2004 | Langseth et al. | |
| 6,788,768 B1 | 9/2004 | Saylor et al. | |
| 6,788,779 B2 | 9/2004 | Ostapchuck | |
| 6,798,867 B1 | 9/2004 | Zirngibl et al. | |
| 6,829,334 B1 | 12/2004 | Zirngibl et al. | |
| 6,836,537 B1 | 12/2004 | Zirngibl et al. | |
| 6,850,603 B1 | 2/2005 | Eberle et al. | |
| 6,854,154 B2 | 2/2005 | Masuda | |
| 6,873,693 B1 | 3/2005 | Langseth et al. | |
| 6,885,734 B1 | 4/2005 | Eberle et al. | |
| 6,895,084 B1 | 5/2005 | Saylor et al. | |
| 6,920,425 B1 | 7/2005 | Will et al. | |
| 6,940,953 B1 | 9/2005 | Eberle et al. | |
| 6,964,012 B1 | 11/2005 | Zirngibl et al. | |
| 6,977,992 B2 | 12/2005 | Zirngibl et al. | |
| 7,020,251 B2 | 3/2006 | Zirngibl et al. | |
| 7,062,020 B1 | 6/2006 | Pirasteh et al. | |
| 7,082,422 B1 | 7/2006 | Zirngibl et al. | |
| 7,197,461 B1 | 3/2007 | Eberle et al. | |
| 7,266,181 B1 | 9/2007 | Zirngibl et al. | |
| 7,272,212 B2 | 9/2007 | Eberle et al. | |
| 7,296,226 B2 | 11/2007 | Junkermann | |
| 7,340,040 B1 | 3/2008 | Saylor et al. | |
| 7,428,302 B2 | 9/2008 | Zirngibl et al. | |
| 7,440,898 B1 | 10/2008 | Eberle et al. | |
| 7,457,397 B1 | 11/2008 | Saylor et al. | |
| 7,486,780 B2 | 2/2009 | Zirngibl et al. | |
| 7,487,094 B1 | 2/2009 | Konig et al. | |
| 7,831,693 B2 | 11/2010 | Lai | |
| 8,018,921 B2 | 9/2011 | Pogossiants et al. | |
| 8,041,575 B2 | 10/2011 | Agarwal et al. | |
| 8,117,538 B2 | 2/2012 | Anisimov et al. | |
| 8,200,527 B1 | 6/2012 | Thompson et al. | |
| 8,238,533 B2 | 8/2012 | Blackwell et al. | |
| 8,300,798 B1 | 10/2012 | Wu et al. | |
| 8,369,509 B2 | 2/2013 | Jennings | |
| 8,571,195 B2 | 10/2013 | Pasi et al. | |
| 8,582,727 B2 | 11/2013 | Saylor et al. | |
| 8,654,934 B2 | 2/2014 | Saylor et al. | |
| 8,699,674 B2 | 4/2014 | Bouzid et al. | |
| 8,917,828 B2 | 12/2014 | Bouzid et al. | |
| 9,083,795 B1 | 7/2015 | Saylor et al. | |
| 9,245,525 B2 | 1/2016 | Yeracaris et al. | |
| 9,285,974 B2 | 3/2016 | Kumar et al. | |
| 9,468,040 B2 | 10/2016 | Bouzid et al. | |
| 9,479,640 B1 | 10/2016 | Saylor et al. | |
| 9,571,636 B2 | 2/2017 | Kumar et al. | |
| 2002/0035474 A1 | 3/2002 | Alpdemir | |
| 2002/0175943 A1 | 11/2002 | Hunt et al. | |
| 2003/0125958 A1 | 7/2003 | Alpdemir et al. | |
| 2003/0144843 A1 | 7/2003 | Belrose | |
| 2003/0182622 A1 | 9/2003 | Sibal et al. | |
| 2003/0231758 A1 | 12/2003 | Bock et al. | |
| 2004/0042592 A1 | 3/2004 | Knott et al. | |
| 2004/0066416 A1 | 4/2004 | Knott et al. | |
| 2004/0104938 A1 | 6/2004 | Saraswat et al. | |
| 2004/0117804 A1 | 6/2004 | Scahill et al. | |
| 2004/0205731 A1* | 10/2004 | Junkermann | G06F 9/4428 717/136 |
| 2005/0065837 A1 | 3/2005 | Kosiba et al. | |
| 2005/0141679 A1 | 6/2005 | Zirngibl et al. | |
| 2005/0207545 A1 | 9/2005 | Gao et al. | |
| 2005/0273759 A1 | 12/2005 | Lucassen et al. | |
| 2006/0018440 A1 | 1/2006 | Watkins et al. | |
| 2006/0109975 A1 | 5/2006 | Judkins et al. | |
| 2007/0250841 A1 | 10/2007 | Scahill et al. | |
| 2007/0286162 A1 | 12/2007 | Fabbrizio et al. | |
| 2008/0065390 A1 | 3/2008 | Ativanichayaphong et al. | |
| 2009/0138269 A1 | 5/2009 | Agarwal et al. | |
| 2009/0204603 A1 | 8/2009 | Martino et al. | |
| 2010/0162101 A1 | 6/2010 | Anisimov et al. | |
| 2011/0196979 A1 | 8/2011 | Maes | |
| 2011/0286586 A1 | 11/2011 | Saylor et al. | |
| 2011/0293078 A1 | 12/2011 | Saylor et al. | |
| 2012/0084751 A1 | 4/2012 | Makagon et al. | |
| 2012/0173386 A1 | 7/2012 | Moon et al. | |
| 2012/0300921 A1 | 11/2012 | Jennings | |
| 2013/0028396 A1 | 1/2013 | Pasi et al. | |
| 2013/0204626 A1 | 8/2013 | Marcus | |
| 2014/0024350 A1 | 1/2014 | Bouzid et al. | |
| 2014/0177821 A1 | 6/2014 | Ristock et al. | |
| 2014/0188475 A1 | 7/2014 | Lev-Tov et al. | |
| 2014/0247927 A1 | 9/2014 | Bouzid et al. | |
| 2014/0348319 A1 | 11/2014 | Bouzid et al. | |
| 2015/0248226 A1 | 9/2015 | Kumar et al. | |
| 2015/0281436 A1 | 10/2015 | Kumar et al. | |
| 2015/0281445 A1 | 10/2015 | Kumar et al. | |
| 2015/0319303 A1 | 11/2015 | Saylor et al. | |
| 2015/0350429 A1 | 12/2015 | Kumar et al. | |
| 2016/0034260 A1 | 2/2016 | Ristock et al. | |
| 2016/0191705 A1 | 6/2016 | Kumar et al. | |
| 2016/0196053 A1 | 7/2016 | Kumar et al. | |
| 2017/0118349 A1 | 4/2017 | Saylor et al. | |
| 2017/0155766 A1 | 6/2017 | Kumar et al. | |

OTHER PUBLICATIONS

Bellman, Dynamic programming, Princeton University Press, 1957, pp. 169-199.

Brown et al., Class-based n-gram models of natural language, J Computational Linguistics, 1992, 18(4): 467-479.

Cisco Unified Contact Center Express Editor Step Reference Guide, Release 9.0(1), Retrieved from the Internet: http://www.cisco.com/c/dam/en/us/td/docs/voice_ip_comm/cust_contact/contact_center/crs/express_9_0/programming/guide/SeriesVol2.pdf, Jul. 6, 2012, 248 pages.

Cisco Unified Contact Center Express Solution Refernce Network Design Release 9.0(1), Retrieved from the Internet: http://www.cisco.com/c/en/us/td/docs/voice_ip_comm/cust_contact/contact_center/crs/express_9_0/design/UCCX_BK_UD5B347F_00_uccx-solution-reference-network-design, Jul. 6, 2016, 156 pages.

Extended European Search Report for Application No. 14846310.2, dated Jan. 17, 2017, 12 pages.

Supplementary European Search Report for Application No. 14846310.2, dated Sep. 23, 2016, 8 pages.

International Preliminary Report on Patentability for PCT/US2011/033505, dated Oct. 23, 2012, 10 pages.

International Search Report and Written Opinion for International Application No. PCT/US2014/056452, dated Dec. 29, 2014, 14 pages,.

(56) References Cited

OTHER PUBLICATIONS

U.S. Non-Final Office Action for U.S. Appl. No. 13/092,090 dated May 9, 2013, 12 pages.
U.S. Non-Final Office Action for U.S. Appl. No. 13/092,101 dated Mar. 11, 2013, 12 pages.
U.S. Non-Final Office Action for U.S. Appl. No. 14/058,661 dated Sep. 4, 2014, 13 pages.
U.S. Notice of Allowance for U.S. Appl. No. 13/092,090 dated Oct. 9, 2013, 13 pages.
U.S. Notice of Allowance for U.S. Appl. No. 13/092,101 dated Jul. 12, 2013, 11 pages.
U.S. Notice of Allowance for U.S. Appl. No. 14/032,443 dated Jul. 22, 2014, 13 pages.
U.S. Notice of Allowance for U.S. Appl. No. 14/170,722 dated Oct. 27, 2014, 19 pages.
International Search Report and Written Opinion of the International Searching Authority in International Application No. PCT/US2011/033505, dated Aug. 2, 2011, 11 pages.
Canadian Office Action for Application No. 2,928,357, dated Mar. 2, 2017, 3 pages.
Korean Office action with English Translation for Application No. 10-2016-7010439, dated Mar. 17, 2017, 19 pages.
Korean Decision of Rejection and English Translation for Application No. 10-2016-7010439, dated Jan. 26, 2016, 12 pages.

\* cited by examiner

FIG. 2E

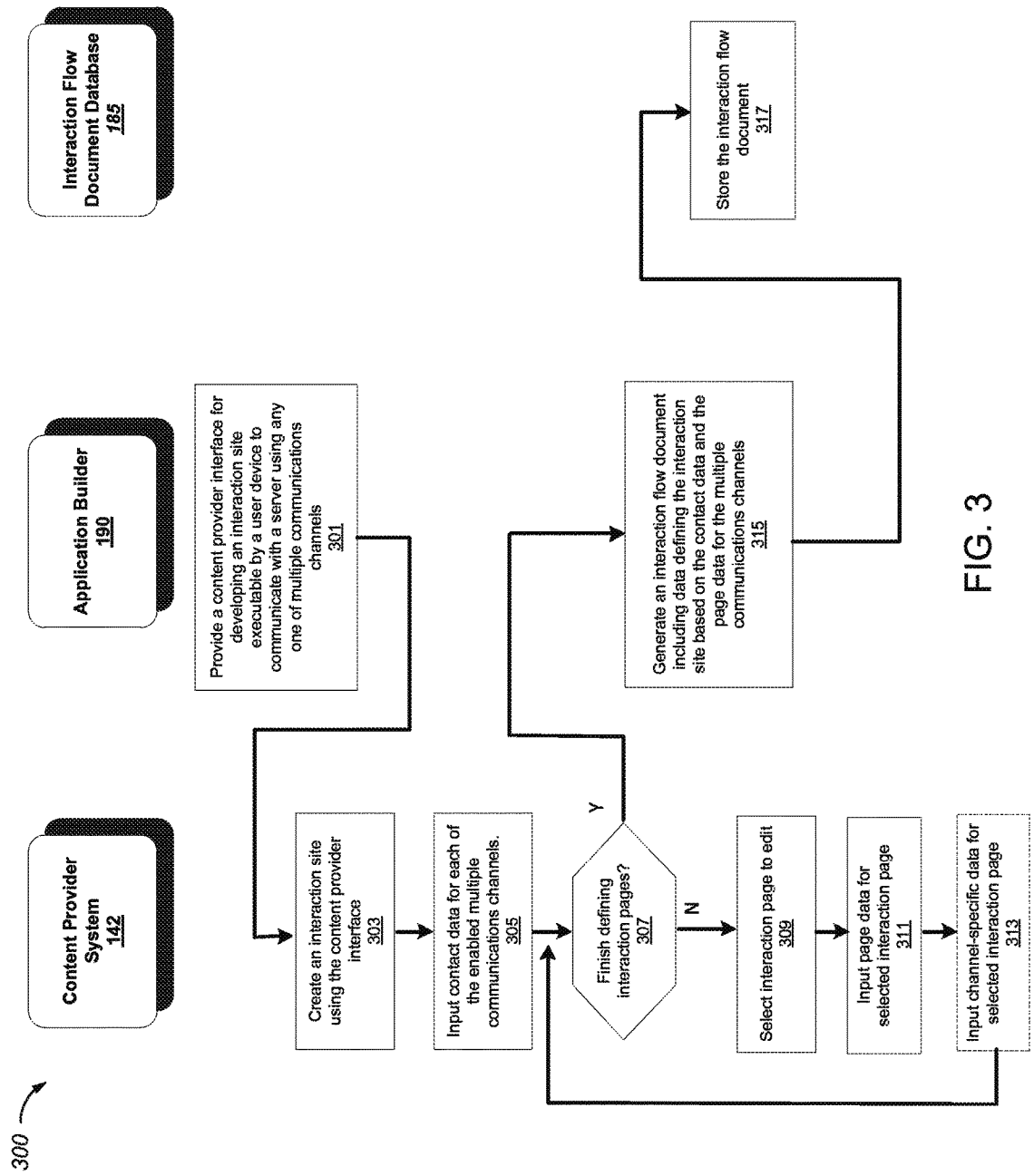

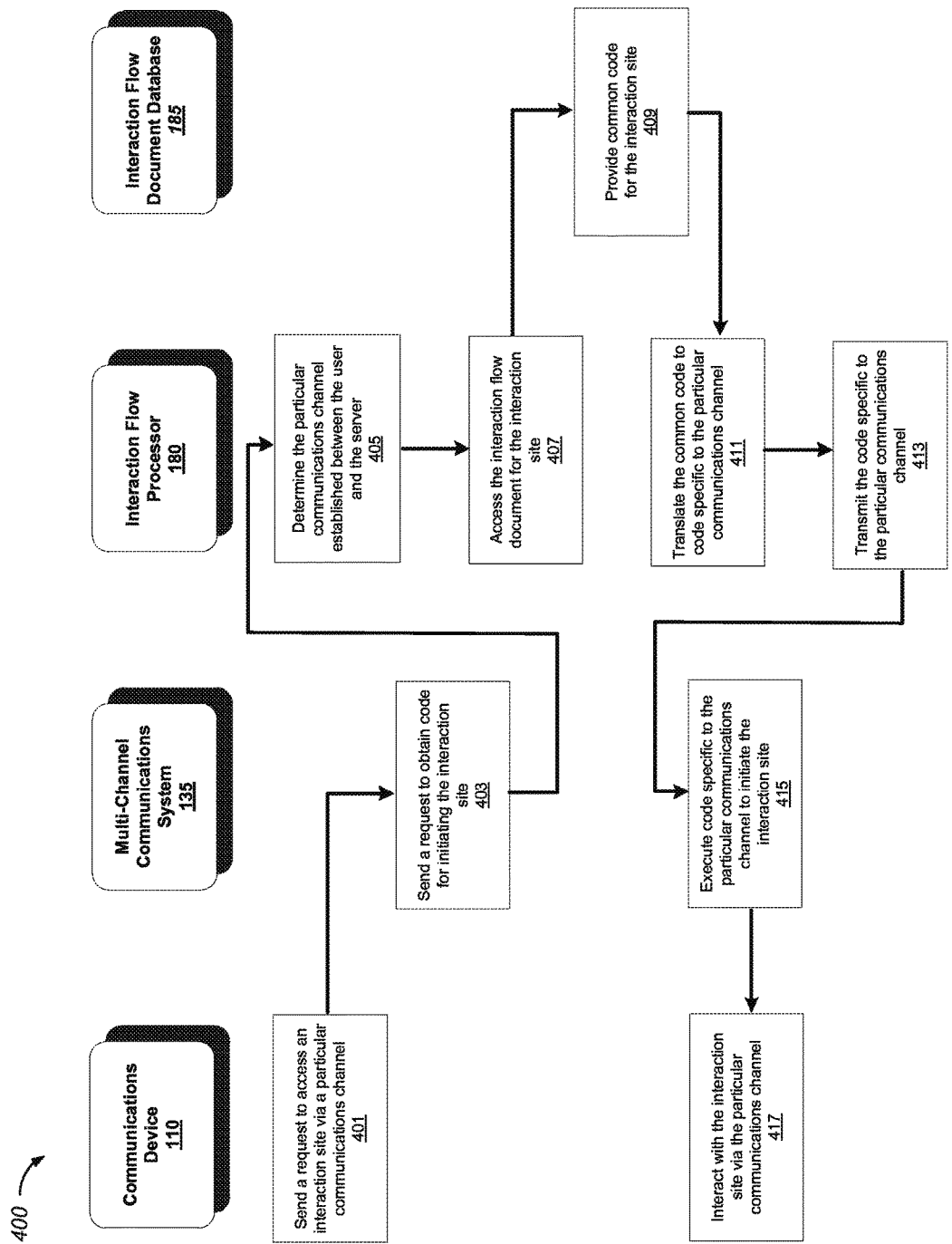

MULTI-CHANNEL DELIVERY PLATFORM

CROSS-REFERENCE TO RELATED APPLICATIONS

This application is a continuation of U.S. patent application Ser. No. 14/453,113, filed on Aug. 6, 2014, now U.S. Pat. No. 9,468,040, which is a continuation of U.S. patent application Ser. No. 14/032,443, filed on Sep. 20, 2013, now U.S. Pat. No. 8,917,828, which is a continuation-in-part of U.S. patent application Ser. No. 13/092,090, filed on Apr. 21, 2011, now U.S. Pat. No. 8,654,934, which claims the benefit of U.S. Provisional Application No. 61/326,636, filed on Apr. 21, 2010, and U.S. Provisional Application No. 61/326,616, filed on Apr. 21, 2010, all of which are incorporated herein by reference in their entirety.

TECHNICAL FIELD

The following disclosure relates generally to the development and delivery of a multi-channel interaction application.

BACKGROUND

A user may use a personal communications device to contact a company to discuss a service or a product provided by the company. The user may contact the company by establishing electronic communications with the company over one or more of multiple different communications channels (e.g., phone, email, chat, or Short Message Service (SMS) that support communications).

SUMMARY

In a general aspect, a request to execute an interaction site for enabling communications to be exchanged between a multi-channel communications system and a user device is received by an interaction flow processor and from the multi-channel communications system. The interaction site is identified based on the request. An interaction flow document for the identified interaction site is accessed, the interaction flow document including code for initiating the interaction site between a user device and the multi-channel communications system to enable the user device to communicate with the multi-channel communications system using any one of multiple different communications channels including an interactive voice response (IVR) channel. A communications channel used by the user device to contact the multi-channel communications system is determined by the interaction flow processor. Based on the determined communications channel, the code of the interaction flow document is translated to code executable by the multi-channel communications system to enable the multi-channel communications system and the user device to exchange communications over the determined communications channel. A response that includes the translated code is transmitted to the multi-channel communications system.

Implementations may include one or more of the following features. For example, to determine the communications channel used by the user device to contact the multi-channel communications system, the communications channel may be determined based on an identifier that indicates the communications channel in the request.

The code executable by the multi-channel communications system may include information identifying additional resource requirements associated with the determined communications channel. The request may be a request for scripts for executing a particular state of the interaction site. The request may be a request for scripts for executing an entire flow of the interaction site.

The code of the interaction flow document may include XML scripts that correspond to pages of the interaction site. The code of the interaction flow document may include a first scripting language, and the code executable by the multi-channel communications system may include a second, different scripting language.

The multiple different communications channels may include at least one of a SMS channel, a chat channel, and an email channel. The interaction site may include one or more interaction pages that correspond to a flow of the interaction site.

In another general aspect of a system includes an interaction flow processor configured to receive, from a multi-channel communications system, a request to execute an interaction site for enabling communications to be exchanged between the multi-channel communications system and a user device, identify the interaction site based on the request, access an interaction flow document for the identified interaction site, the interaction flow document including code for initiating the interaction site between a user device and the multi-channel communications system to enable the user device to communicate with the multi-channel communications system using any one of multiple different communications channels including an interactive voice response (IVR) channel, determine a communications channel used by the user device to contact the multi-channel communications system, based on the determined communications channel, translate the code of the interaction flow document to code executable by the multi-channel communications system to enable the multi-channel communications system and the user device to exchange communications over the determined communications channel, and transmit, to the multi-channel communications system, a response that includes the translated code.

Implementations may include one or more of the following features. For example, the system may include a multi-channel communications system configured to send the request to the interaction flow processor to execute the interaction site for enabling communications to be exchanged between the multi-channel communications system and the user device, receive the response that includes the translated code to enable the multi-channel communications system and the user device to exchange communications over the determined communications channel, and execute the translated code to initiate the interaction site with the user device to exchange communications over the determined communications channel.

The system may include an interaction flow document database configured to store the interaction flow document for the identified interaction site. The multiple different communications channels may include at least one of a SMS channel, a chat channel, and an email channel. The code executable by the multi-channel communications system may include information identifying additional resource requirements associated with the determined communications channel. The request may be a request for scripts for executing a particular state of the interaction site.

In another general aspect, instructions that when executed, provide a development interface for generating an interaction flow document, the interaction flow document including code for an interaction site that enables communications between a user device and a multi-channel communications system over any one of multiple communications channels including an interactive voice response (IVR) channel, are transmitted, to a content provider device, where the interaction site specifies a multi-step communication flow between the user device and the multi-channel communications system and is associated with one or more interaction pages, the one or more interaction pages being configured by a user of the content provider device through interactions with the development interface to include values for generic parameters and values for channel-specific parameters, the generic parameters being associated with communications between the user device and the multi-channel communications system independent of which channel of the multiple communications channels is used, and the channel-specific parameters being associated with communications between the user device and the multi-channel communications system specific to one of the multiple communications channels. One or more generic values corresponding to one or more of the generic parameters are received from the content provider device. One or more channel-specific values corresponding to one or more of the channel-specific parameters are received from the content provider device. An interaction flow document for the interaction site is generated based on the received one or more generic values and the received one or more channel-specific values.

Implementations may include one or more of the following features. For example a listing of communications channels that is selectable for the user of the content provider device to identify the multiple communications channels that are accessible by the user device may be provided. The interaction flow document in an interaction flow document database may be stored.

The multiple communications channels may include at least one of a SMS channel, a chat channel, and an email channel. The interaction flow document may include XML scripts that correspond to the one or more interaction pages of the interaction site configured by the user of the content provider device.

The details of one or more implementations are set forth in the accompanying drawings and the description below. Other potential features and advantages will become apparent from the description, the drawings, and the claims.

BRIEF DESCRIPTION OF THE FIGURES

FIGS. 2A-2J illustrate a GUI for an application development tool that is used by a content provider to create an interaction site for a multi-channel communications system.

FIG. 3 is a flow chart illustrating an example of a process for a content provider to create and host an interaction site.

FIG. 4 is a flow chart illustrating an example of a process for a user to communicate with a multi-channel communications system and access an interaction site via a communications channel.

DETAILED DESCRIPTION

Figure 1:
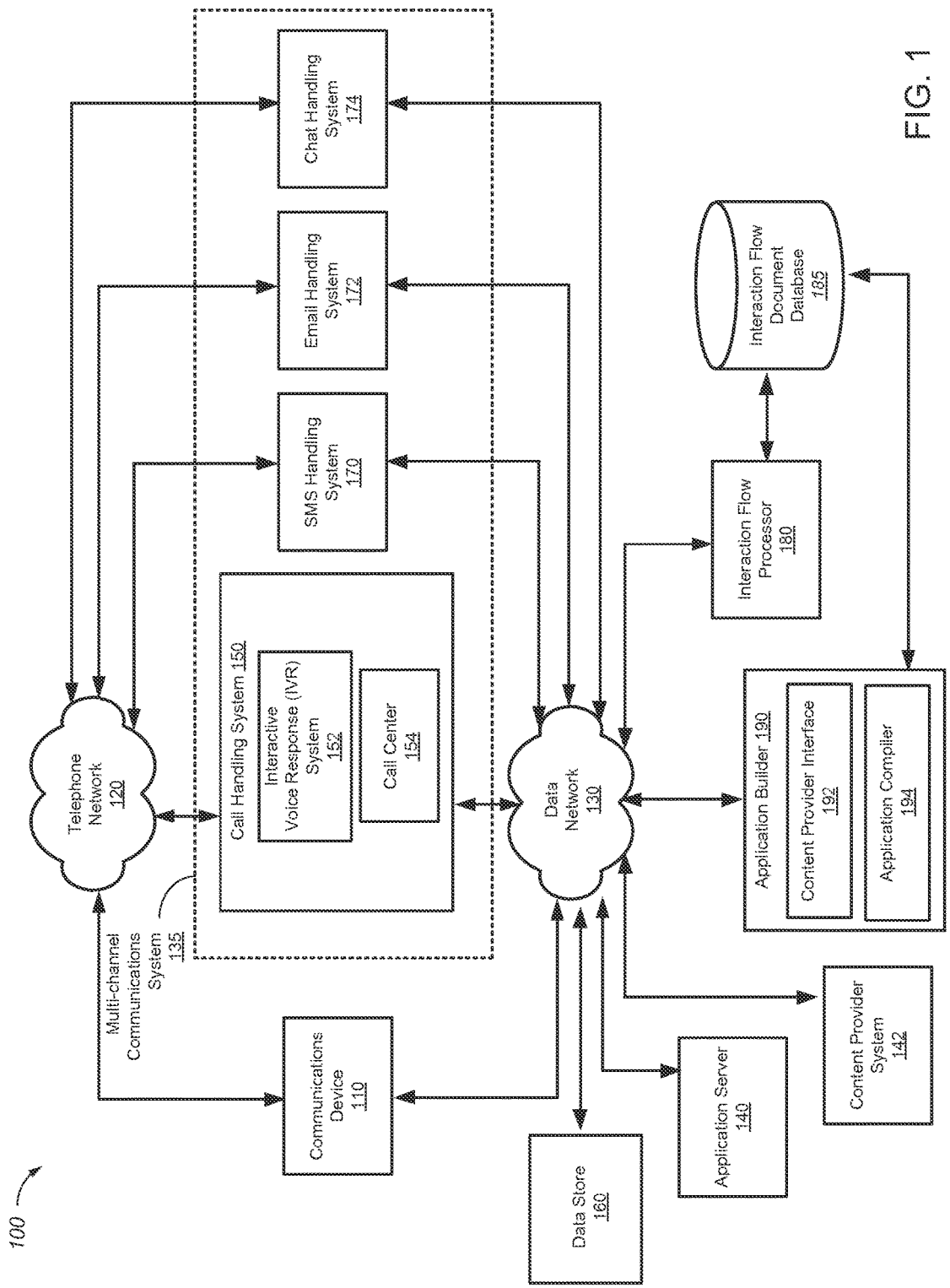
FIG. 1 is a block diagram of a communications system that provides development and access of interaction sites in a multi-channel solution platform.

A company may wish to enable its customers to contact it through use of any of multiple different communications channels (e.g., phone, email, chat, SMS or another communications channel that support communications between a customer and a service/product provider). To save costs, the company may wish to interact with the customers, at least initially, using an automated response system. Use of such an automated response system may decrease the costs associated with responding to customer contacts by decreasing the number of human agents that need to be employed to respond to the customer contacts. Many customer contacts are for routine inquiries (e.g., a customer contacts the company to check the balance of a checking account or of a credit card) and, therefore, lend themselves well to being efficiently and cost-effectively handled through use of an automated response system. In contrast, more complex customer contacts, which are typically far fewer in number, may be routed to human agents for handling.

Each of the multiple different channels may offer the same interactive experience to customers. For example, a customer may interact with the company by any one of phone, email, text messaging, and chat/instant messaging to check his bank account balance or his credit card balance. The interaction flow for these multiple different communication channels may, therefore, share many common states and characteristics. Given this, it may be useful to provide such companies with the ability to design, and develop a single interaction site that captures the common interaction flow and leverages that common flow to enable customers to interact with the company in an automated fashion via any one of multiple different channels. For ease of exposition, the following description begins by describing a voice site, which is configured to receive and respond to telephone contacts, and then expands the description to cover an interaction site that supports contacts over any one of multiple different communication channels (e.g., email contacts, chat contacts, and SMS contacts).

A user of a particular product or service provided by the company may need to contact customer service for the product or service to troubleshoot a problem the user is experiencing in using the product or service. In order to contact the customer service and obtain a solution to the problem, the user may call a known customer service number for the product or service. By calling the customer service number, the user may get connected to a call handling system that enables the user to interact with a voice site associated with the product or service.

A voice site is a set of scripts or, more generally, programming language modules corresponding to one or more linked pages that collectively interoperate to produce an automated interactive experience with a user. A standard voice site includes scripts or programming language modules corresponding to at least one voice page and limits the interaction with the user to an audio communications mode. Because customers typically access a voice site by calling a telephone number using a telephone, a standard voice site is typically referred to as a single channel interaction site, i.e., an interaction site that supports a single type of contact. An enhanced voice site may include scripts or programming language modules corresponding to at least one voice page and at least one multimodal action page linked to the at least one voice page that enable interaction with the user to occur via an audio communications mode and at least one additional communications mode (e.g., a text communications mode, an image communications mode or a video communications mode). An enhanced voice site may, therefore, be referred to as a single channel interaction site that has been enhanced to enable some portions of the interaction flow to involve the communication of multimedia information. Notably, a call may be said to be directed to a voice site if it is directed to a telephone number that has been defined as corresponding to the voice site.

The voice site called by the user may be an automated interactive voice site that is configured to process, using pre-programmed scripts, information received from the user that is input through the telephonic device being used by the user, and, in response, provide information to the user that is conveyed to the user through the telephonic device. The interaction between the user and the voice site may be done using an interactive voice response system (IVR) provided by a service provider that is hosting the voice site. The TYR is configured to support voice commands and voice information using text-to-speech processing and natural language processing by using scripts that are pre-programmed for the voice site, for example, voice-extensible markup language (VoiceXML) scripts. The IVR interacts with the user by using audible commands to prompt the user to provide information and enabling the user to input the information by speaking into the telephonic device or by pressing buttons on the telephonic device (when using, for example, a touch-tone telephone). The information input by the user is conveyed to the IVR over a voice communications session that is established between the telephonic device and the IVR when the call is connected. Upon receiving the information, the IVR processes the information using the pre-programmed scripts. The IVR may be configured to send audible responses back to the user via the telephonic device.

In some implementations, the voice site may be an enhanced voice site that is configured to support multimedia information including audio, video, images and text. The telephonic device also may be an advanced telephonic device (e.g., a smart phone) provided with a display for conveying visual information to the user, and a processor capable of performing complex tasks such as logic processing wherein the associated instructions may be stored in memory included in the telephonic device. In such circumstances, the advanced telephonic device and the enhanced voice site can interact using one or more of voice, video, images or text information and commands.

As noted previously, a customer typically accesses a voice site by calling a telephone number using a telephone. A voice site, therefore, is a single channel interaction site in that it receives and responds to contacts that are telephone calls. In contrast, a multi-channel interaction site receives and responds to contacts in an automated fashion received via any one of multiple different communications channels supported by a multi-channel communications system/platform. For example, a multi-channel interaction site may receive and respond to contacts that are telephone calls, email messages, SMS messages, and/or chat messages. Moreover, the multi-channel interaction site may provide the same interaction flow with the customer irrespective of which channel was used by the customer to initially contact the site. For example, the same or substantially the same interaction flow may be used for enabling the customer to access their bank account information and perform banking transactions, irrespective of which type of contact is used by the customer to contact the bank's automated response system.

Interacting with a multi-channel interaction site may be useful in several situations. A multi-channel interaction site allows the user to receive the same service, independent of how the user wishes to contact the company associated with the multi-channel interaction site and independent of the device that the user wishes to use when contacting the company. For example, if the user is operating a telephonic device but does not wish to talk to a person or a machine, the user may contact customer service for the same product or service via short message service (SMS) using a short code and a keyword. As another example, if the user is operating a laptop computer or other types of communications devices, the user may contact customer service for the same product or service via a chat room using a hyperlink or a website address. As another example, if the user does not have time to complete the entire service transaction in one continuous session, the user may contact customer service for the same product or service via an email and interact with the customer service via the subsequent communication of one or more emails or, alternatively, one or more instant messages or chat messages.

An interaction site accessed by the user may be an automated interaction site that is configured to process, using pre-programmed scripts, information received from the user that is input through the communications device being used by the user via the communications channel used by the user to contact (i.e., initially contact) the site. The interaction site may, in response, provide information to the user that is conveyed to the user through the communications device via the same communications channel. A standard interaction site limits the interaction with the customer to the mode of communications associated with the communications channel used by the customer to contact the site. A standard interaction site is a set of scripts or, more generally, programming language modules corresponding to one or more linked interaction pages that collectively interoperate to produce an automated interactive experience with a user. A standard interaction site may be either a single channel interaction site (e.g., a standard voice site), which receives and responds to contacts received over a single channel, or a multi-channel interaction site, which receives and responds to contacts received over any of multiple different channels.

In contrast, an enhanced interaction site may include scripts or programming language modules corresponding to at least one interaction page and at least one multimodal action page linked to the at least one interaction page that enable interaction with the user to occur via the communications mode used by the user to initially contact the site (e.g., an audio communications mode for a telephone call contact) and at least one additional communications mode (e.g., a text communications mode, an image communications mode or a video communications mode). An enhanced interaction site may, therefore, be either a single channel interaction site (e.g., an enhanced voice site) or a multi-channel interaction site that has been enhanced to enable some portions of the interaction flow to involve the communication of multimedia information.

The interaction between the user and the interaction site may be done using a sub-system directed to servicing a particular communications channel (e.g., an IVR, which is directed to servicing telephone call contacts) in a multi-channel communications system provided by a service provider that is hosting the interaction site. Each sub-system in the multi-channel communications system may be configured to support a particular communications channel, and to process commands and information by using scripts or programming modules that are translated from pre-programmed scripts or programming modules that constitute the interaction site. That is, an interaction site may be a set of scripts or programming modules that offer a common interaction flow for handling contacts received over different channels. The set of scripts or programming modules may then be translated by an interaction flow processor into a corresponding set of channel-specific scripts or programming modules for each channel supported by the interaction site, and these translated channel-specific scripts or programming modules may then be executed by the respective sub-systems of the multi-channel communications system to enable automated interactions with users over the different channels. For example, the pre-programmed scripts of the interaction site may be extensible markup language (XML) scripts. If the user accesses the multi-channel communications system by using a telephone to call a telephone number associated with the interaction site, the interaction flow processor may translate the XML scripts of the interaction site to VoiceXML scripts for processing by an IVR to interact with the calling user.

The interaction site may be hosted by a third party service provider that facilitates the creation and hosting of interaction sites on servers owned and operated by the service provider. The service provider may provide a service/method that enables the design, development, and hosting of interaction sites or applications that run a thin client on the communications device that interacts with a fully hosted, on-demand interaction solution platform maintained and managed by the service provider. The service/method provides a way to develop an interaction site that is supported by a multi-channel communications system (the server side) and allows a communications interaction between the client and the server to be established via any one of the communications channels supported by the interaction site. In some implementations, the service/method may require an installation of a thin client engine (e.g., an application) on the communications device of the user that mediates between the objects and devices in the communications device and the multi-channel communications system supporting the interaction site hosted by the service provider.

In the above scenario, the role of the entity providing customer service through the interaction site is that of a content provider. The developer of the entity/company (hereinafter referred to interchangeably as the "content provider") configures the interaction site that is to be used for the particular product or service and provides the logic for the interaction site that is to be executed by the multi-channel communications system. The content provider may do so by using a graphical user interface (GUI) provided by the third party service provider for configuring the interaction site. The service provider handles the interpretation and compilation of the information provided by the content provider, and the creation and hosting of the interaction site based on the information. Since the service provider manages the multi-channel communications system, the service provider may allow the content provider to develop the interaction site using one unified GUI interface, where the interaction site is executable by the user via any one or more of multiple different communications channels.

The service/method thus enables the deployment of interaction-enabled solutions on communications devices without requiring the content provider to engage in complex programming. Applications, or interaction sites, may be designed by the content provider using a web-based or remotely accessible interface, and served on demand to clients. In some implementations, clients can be add-ons that smart phone applications can plug into. In some implementations, the service/method enable users to interact with a multi-channel application. The application is referred to as multi-channel in that it enables users to contact and interact with a multi-channel interaction platform via any of multiple different communications channels (e.g., phone, email, chat, Short Message Service (SMS), or another communications channel that support communications between the user and the interaction site). For example, the user may contact the multi-channel platform (e.g., by phone) and provide information to the multi-channel platform by speaking and may receive information from the multi-channel platform by hearing. Alternatively, the user may instead choose to contact the multi-channel platform (e.g., by SMS, chat room, or email) and provide the same information to the multi-channel platform by typing text and receive the same information from the multi-channel platform by reading text.

FIG. 1 is a block diagram of a communications system 100 that provides a development platform for interaction sites and access to these interaction sites in a multi-channel solution platform. Referring to FIG. 1, a user of a communications device (i.e., a smart phone) 110 is able to interact with the communications device 110 to request a service from an interaction site that is provided, for example, by a content provider. The service may be, for example, a request to purchase a particular product or service offered by or made available by the content provider through the interaction site. For example, the user may indicate a desire to request a service from the interaction site by selecting a graphically displayed icon on a graphical user interface (GUI) of the communications device 110 to thereby invoke an application stored in the communications device 110 with which the user can interact to initiate a service request. Additionally or alternatively, the user may indicate a desire to request a service by inputting, via manual selection or otherwise, a telephone number associated with the customer service department into the communications device 110 and initiating a call directed to the inputted telephone number. Additionally or alternatively, the user may indicate a desire to request a service by inputting and sending, via manual selection or otherwise, a SMS message that includes a short code and a keyword associated with the customer service department into the communications device 110. Additionally or alternatively, the user may indicate a desire to request a service by inputting, via manual selection or otherwise, a uniform resource locator (URL) associated with the customer service department into the communications device 110 to initiate a chat session with the customer service department. Additionally or alternatively, the user may indicate a desire to request a service by inputting and sending, via manual selection or otherwise, an email that includes an email address associated with the customer service department into the communications device 110. Additionally or alternatively, the user may indicate a desire to request a service via a communications channel not listed in the above examples.

In some implementations, the request for the service or product may be directed to a multi-channel communications system 135, and an interaction site may be invoked, where the multi-channel communications system 135 communicates with the communications device 110 to provide the requested service. As mentioned previously, an interaction site may be hosted by a third party service provider that facilitates the creation and hosting of interaction sites on servers owned and operated by the service provider. Depending on the communications means that a user uses to access an interaction site, a corresponding handling system in the multi-channel communications system 135 may be used to process the request. Each handling system may present the interaction site to the user in a different manner. For example, a call handling system may present the interaction site to the user using voice messages that are generated by VoiceXML scripts. As another example, a SMS handling system may present the interaction site to the user using SMS messages that are generated by XML scripts.

However, in many applications, the flow for providing a service to the user includes the same steps regardless of which communications channel the user is using. From a content provider's perspective, it is a burden to require developing an interaction site for each of the communications channels using different tools or scripting languages. From a service provider's perspective, the storage and management of an interaction site having different versions for each of the communications channels may be complicated. Accordingly, a communications system that can integrate the development of an interaction site for each of the communications channels using one development platform, and compile the developed interaction site into one scripting language that can be translated based on the communications channel used by a user may enable a content provider and/or service provider to enjoy a decrease in costs associated with developing and managing interaction sites without compromising the quality of the user experience with the interaction site.

The communications system 100 is an example implementation of a system that supports an interactive multi-channel delivery platform. In general, the communications system 100 includes the communications device 110, a telephone network 120, a data network 130, the multi-channel communications system 135, a content provider system 142, an interaction flow processor 180, an interaction flow document database 185, and an application builder 190. The communications system 100 may additionally include an application server 140, and a data store 160.

The communications device 110 is configured to allow a user to interact with the multi-channel communications system 135 across the telephone network 120 and/or across the data network 130. The communications device 110 may be a cellular phone or a mobile personal digital assistant (PDA) with embedded cellular phone technology. The communications device 110 may be a computer that includes one or more software or hardware applications for performing communications between the communications device 110 and the multi-channel communications system 135. The communications device 110 may have various input/output devices with which a user may interact to provide and receive audio, text, video, and other forms of data.

The telephone network 120 may include a circuit-switched voice network, a packet-switched data network, or any other network able to carry voice data. For example, circuit-switched voice networks may include a Public Switched Telephone Network (PSTN), and packet-switched data networks may include networks based on the Internet protocol (IP) or asynchronous transfer mode (ATM), and may support voice using, for example, Voice-over-IP, Voice-over-ATM, or other comparable protocols used for voice data communications.

The data network 130 is configured to enable direct or indirect communications between the communications device 110, the multi-channel communications system 135, and/or the application server 140. Examples of the data network 130 include the Internet, Wide Area Networks (WANs), Local Area Networks (LANs), analog or digital wired and wireless telephone networks (e.g., Public Switched Telephone Network (PSTN), Integrated Services Digital Network (ISDN), and Digital Subscriber Line (xDSL)), radio, television, cable, satellite, and/or any other delivery or tunneling mechanism for carrying data. In some implementations, the data network 130 and the telephone network 120 are implemented by a single or otherwise integrated communications network configured to enable communications between the communications device 110 and the multi-channel communications system 135.

A multi-channel communications system 135 receives the request and interacts with the communications device 110 to provide the requested service through the interaction site. The multi-channel communications system 135 may include a call handling system 150, a SMS handling system 170, an email handling system 172, and a chat handling system 174.

The call handling system 150 is configured to handle a request to interact with an interaction site using a voice channel. The call handling system 150 may include an IVR system 152 configured to receive a call from the communications device 110 when the communications device 110 is operating under a voice communications channel. In some implementations, the call handling system 150 may additionally include a call center 154.

The IVR 152 may include a voice gateway coupled to an interaction flow processor 180 via a data network. Alternatively, the voice gateway may be local to the interaction flow processor 180 and connected directly to the interaction flow processor 180. The voice gateway is a gateway that receives user calls from or places calls to voice communications devices, such as the communications device 110, and responds to the calls in accordance with a voice program that corresponds to a flow of an interaction site. The voice program may be accessed from local memory within the voice gateway or from the interaction flow processor 180. In some implementations, the voice gateway processes voice programs that are script-based voice applications. The voice program, therefore, may be a script written in a scripting language such as, for example, voice extensible markup language (VoiceXML) or speech application language tags (SALT). The IVR 152 may also be configured to communicate with the data store 160 to read and/or write user interaction data (e.g., state variables for a data communications session) in a shared memory space.

The call center 154 of the call handling system may include, among other components, an inbound call queue, an outbound call request queue, a call router, an automatic call distributor ("ACD") administrator, and a plurality of call center agents. The call center 154 may receive one or more calls from one or more voice communication devices, such as the communications device 110, via the telephone network 120 and may make one or more outbound calls to voice communication devices via the telephone network 120. The call center 154 may determine an appropriate call center agent to route the call to or to assign an outbound call to. The determination of an appropriate agent may be based on agent performance metrics and information known about the inbound or outbound call. The determination of the appropriate agent may, for example, be based on some or all of the form information and/or other optional information received from the communications device 110.

The SMS handling system 170 is configured to handle a request to interact with an interaction site using a SMS channel. The SMS handling system 170 may include a SMS gateway coupled to an interaction flow processor 180 via a data network. Alternatively, the SMS gateway may be local to the interaction flow processor 180 and connected directly to the interaction flow processor 180. The SMS gateway is a gateway that receives user SMS messages from or places SMS messages to communications devices, such as the communications device 110, and responds to the SMS messages in accordance with a SMS program that corresponds to a flow of an interaction site. The SMS program may be accessed from local memory within the SMS gateway or from the interaction flow processor 180. In some implementations, the SMS gateway processes voice programs that are script-based SMS applications. The SMS program, therefore, may be a script written in a scripting language such as, for example, extensible markup language (XML). The SMS handling system 170 may also be configured to communicate with the data store 160 to read and/or write user interaction data (e.g., state variables for a data communications session) in a shared memory space.

The email handling system 172 is configured to handle a request to interact with an interaction site using an email channel. The email handling system 172 may include an email gateway coupled to an interaction flow processor 180 via a data network. Alternatively, the email gateway may be local to the interaction flow processor 180 and connected directly to the interaction flow processor 180. The email gateway is a gateway that receives user emails from or places emails to communications devices, such as the communications device 110, and responds to the emails in accordance with an email program that corresponds to a flow of an interaction site. The email program may be accessed from local memory within the email gateway or from the interaction flow processor 180. In some implementations, the email gateway processes email programs that are script-based email applications. The email program, therefore, may be a script written in a scripting language such as, for example, extensible markup language (XML). The email handling system 172 may also be configured to communicate with the data store 160 to read and/or write user interaction data (e.g., state variables for a data communications session) in a shared memory space.

The chat handling system 174 is configured to handle a request to interact with an interaction site using a chat channel. The chat handling system 174 may include a chat gateway coupled to an interaction flow processor 180 via a data network. Alternatively, the chat gateway may be local to the interaction flow processor 180 and connected directly to the interaction flow processor 180. The chat gateway is a gateway that receives user message from or places messages in a chat session to communications devices, such as the communications device 110, and responds to the messages in accordance with a chat program that corresponds to a flow of an interaction site. The chat program may be accessed from local memory within the chat gateway or from the interaction flow processor 180. In some implementations, the chat gateway processes chat programs that are script-based email applications. The chat program, therefore, may be a script written in a scripting language such as, for example, extensible markup language (XML). The chat handling system 177 may also be configured to communicate with the data store 160 to read and/or write user interaction data (e.g., state variables for a data communications session) in a shared memory space.

The interaction flow processor 180 includes all hardware and software components that interface and provide data to the multi-channel communications system 135. Depending on the communications channel between the user of the communications device 110 and the multi-channel communications system 135, the interaction flow processor 180 sends translated application programs or scripts to the multi-channel communications system 135 for processing user interactions. The user interactions are analyzed by the multi-channel communications system 135 and new programs or scripts that correspond to the next state of the interaction flow may then be sent to the multi-channel communications system 135 for further processing. In some implementations, the interaction flow processor 180 may determine which programs or scripts to provide to the multi-channel communications system 135 based on some or all of the information received from the multi-channel communications system 135 or the communications device 110.

The interaction flow document database 185 stores interaction flow documents created by the application builder 190, and provides the interaction flow processor 180 access to these interaction flow documents. In some implementations, the interaction flow document database 185 may be an array of high-capacity storage drives that are closely coupled to the interaction flow processor 180. In some implementations, the interaction flow document database 185 may be an array of high-capacity storage drives that are closely coupled to the application builder 190.

The content provider system 142 is configured to allow a content provider to interact with the application builder 190 across the data network 130. The content provider system 142 may be a cellular phone or a mobile personal digital assistant (PDA) with embedded cellular phone technology. The content provider system 142 may be a computer that includes one or more software or hardware applications for performing communications between content provider system 142 and the application builder 190. The content provider system 142 may have various input/output devices with which a content provider may interact to provide and receive audio, text, video, and other forms of data from the application builder 190.

The application builder 190 facilitates the creation of interaction sites. The application builder 190 utilizes various components to enable the creation of interaction sites. The various components of the application builder 190 may be co-located in a single physical location, or they may be geographically distributed, with dedicated high capacity links interconnecting the various components. The application builder 190 may include a content provider interface 192 and an application compiler 194.

The content provider interface 192 is a GUI front-end for an application development tool that can be used to build an interaction site that is capable of handling interactions using multiple communications channels. The content provider may access the content provider interface 192 over the data network 130. For example, the content provider may use a web browser that runs on the content provider system 142. By accessing the application development tool using the content provider interface 192, the content provider may create interaction sites and interaction pages that will be used by the multi-channel communications system 135 when processing a request to the interaction site being created by the content provider. In the context of this discussion, a "page" is a discrete programming routine configured to perform a discrete function. A page may be defined by a user through an interaction with, for example, a GUI in which the user may indicate the type of programming routine for the page and may optionally further indicate one or more other pages linked to the page. Processing may then proceed to the one or more other linked pages after completion of execution of the page or, alternatively, after initiation of execution of the page but before completion of execution of the page. A page may be compiled into one or more programming language modules or scripts after the page is defined by the user through interaction with the GUI. The one or more programming language modules or scripts may be used, for example, by a handling system to execute the discrete programming routine to thereby perform the discrete function of the page. Examples of different pages include message pages, question pages, logic pages, transaction pages, and multimodal action pages. These different pages are described in further detail in pending application Ser. No. 13/092,090, which is incorporated herein by reference for all purposes.

An interaction page is a particular type of page that is configured to perform the function of delivering content to and/or receiving content from a user via a communications channel used by the user to contact the multi-channel system (e.g., voice communications channel for telephone contacts, chat communications channel for chat contacts, email communications channel for email contacts, and SMS communications channel for SMS contacts). A "voice page" is a particular type of interaction page that is configured to perform the function of delivering audible content to and/or receiving audible content from a user that called a telephone number assigned to the interaction site. The user is typically a caller to an IVR and the audible content is typically speech. FIGS. 2A-5J illustrate examples of one or more pages provided by a GUI of an application development tool.

The interaction sites and pages created by the content provider using the content provider interface 192 are interpreted and/or compiled by an application compiler 194 to generate scripts that are executed by the multi-channel communications system interacting with a user accessing the interaction site. In some implementations, the application compiler 194 may generate an interaction flow document, which may include XML scripts or code that correspond to pages (i.e., programming modules) of an interaction site created by the content provider. The interaction flow document may be stored in an interaction flow document database 185. The interaction flow processor 180 may access the scripts from the interaction flow document database 185 and translate them into a language that can be processed by a particular handling system when the multi-channel communications system 135 interacts with a user accessing the interaction site.

In addition to the XML scripts, the application compiler 194 may also generate other types of scripts (e.g. Java scripts) and other types of executable code using other programming languages based on pages created for the interaction site by the content provider (e.g., based on transaction pages). The other types of scripts may be used by the multi-channel communications system 135 to interact over the data network 130 with the user accessing the interaction site.

The data store 160 is configured to store user interaction data with interaction sites. In some implementations, the data store 160 may store interaction data associated with a particular user. For example, the interaction data may include the gender and other characteristics of the user, the choices made by the user during each state of the interaction, and the resources utilized during each state of the interaction. In some implementations, the data store 160 may store aggregated interaction data associated with a particular interaction site. For example, the aggregated interaction data may include data specifying a breakdown of genders among all users that accessed the particular interaction site. In some implementations, a user may opt-out such that her usage data is then not stored in the data store 160. In some implementations, a user may opt-in to have her usage data be stored in the data store 160.

The application server 140 is configured to establish a data communications session with the communications device 110 and to receive and send data to the communications device 110 across the data network 130. The application server 140 also is configured to communicate with the call handling system 150 to send data received from the communications device 110 to the IVR 152. The application server 140 also may send other application-related data that did not originate from the communications device 110 to the IVR 152 or, more generally, to the multi-channel communications system 135. The application server 140 also is configured to communicate with the data store 160 to read and/or write user interaction data (e.g., state variables for a data communications session) in a shared memory space. The application server 140 may be one or more computer systems that operate separately or in concert under the direction of one or more software programs to perform the above-noted functions. In some implementations, the application server 140 and the call handling system 150 are a single integrated computer system.

In some implementations, one or more of the handling systems in the multi-channel communications system 135 may communicatively couple with the application server 140 and the data store 160 via the data network 130. For example, the user of the communications device 110 may download an application from the application server 140, and the downloaded application may include an add-on or plug-in, that, when invoked, enables the communications device 110 to automatically communicate with the multi-channel communications system 135 to access an interaction site.

FIGS. 2A-2J illustrate a GUI 200 for an application development tool that is used by a content provider to create a multi-channel interaction site. In general, each interaction site includes a flow of the interaction states that provide an overview of how users interact with the interaction site during the execution of the interaction site. A state may be configured using a page, such as, for example, a voice page or, more generally, an interaction page. In some implementations, the states of the flow for an interaction site are the same across multiple communications channels. For example, a first user may access an interaction site using an IVR system, and in the first state, the first user would experience a "Say Greeting" interaction page which greets the first user via voice. A second user may access the same interaction site using SMS, and according to the flow, the second user would also interact with the "Say Greeting" interaction page which greets the second user via a SMS message. It may be a tedious process if the content provider is required to configure the same greeting message for each of the communications channels. The content provider interface 192 of the application builder 190 provides the content provider with a unified interface to create and configure pages that are common to the various communications channels without the need to enter duplicate information for these communications channels. The GUI 200 may be implemented by the content provider web interface 192 and presented to the content provider 142 when the content provider 142 accesses the application builder 190 using a web browser over the data network 130 to create/manage the interaction site. The following describes the different components of the GUI 200 with respect to the system 100 that is described with reference to FIG. 1. Specifically, the components of the GUI 200 are described as used by the content provider 142 to create an interaction site for providing an ordering service to users of a product associated with the content provider 142. However, the GUI 200 and the associated application development tool may be used by other systems, content providers or application developers to create any interaction site to perform any desired automated interaction flow in response to a customer contact.

Figure 2A:
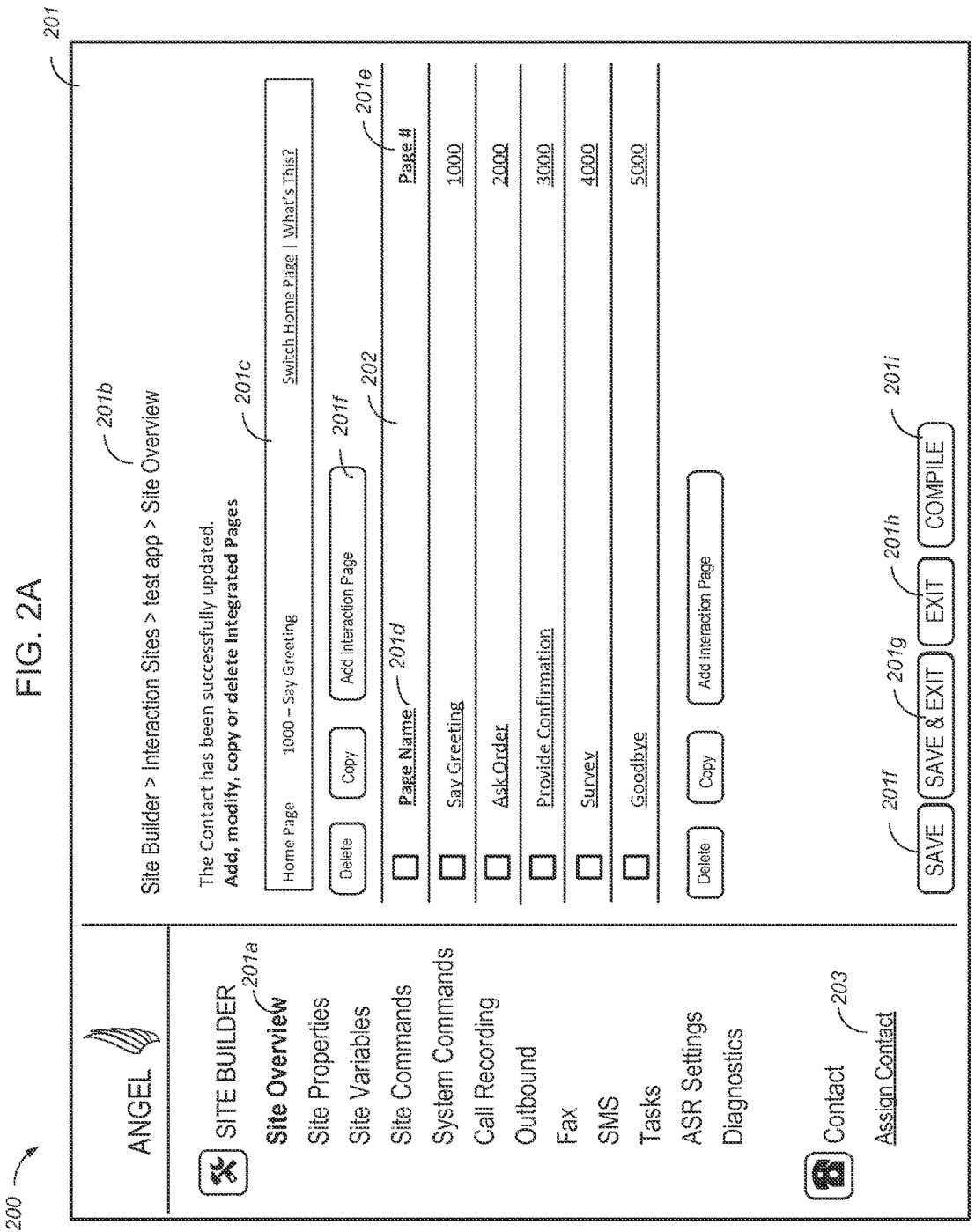

FIG. 2A illustrates an example GUI of an interaction site overview page 201 that is presented to the content provider when the content provider logs into the application builder 190 (e.g., by inputting a user identifier and a password) to create an interaction site using the content provider system 142. The Site Overview page 201 may be accessed by the content provider, for example, by selecting an interaction site from among a displayed list of interaction sites associated with (e.g., designed by or for) the content provider, clicking on the desired interaction site (e.g., "test app") and then clicking on the "Site Overview" link 201a. The Site Overview page 201 provides a listing of the different pages created by the content provider to define the interaction site. The Site Overview page 201 lists all the pages that are included in the interaction site. The name of the interaction site is specified in the heading 201b of the Site Overview page 201 (e.g., "test app").

When the user of communications device 110 interacts with the interaction site, the first page that is processed is identified in the "Home Page" field 201c. The content provider may specify any page that the content provider wants to be processed first as the Home Page 201c. In some implementations, the first page in the listing of pages is the same page that is listed as the "Home Page" 201c. However, in other implementations, the page that is as the "Home Page" 201c is not the first page in the listing of the pages in the Site Overview page 201.

The order in which the various pages are processed is determined by the links in the respective pages. Each page usually contains a link to the next page that is to be processed. For example, the interaction site illustrated in the Site Overview page 201 has a page flow 202 of five interaction pages, including the interaction pages "Say Greeting", "Ask Order", "Provide Confirmation," "Survey," and "Goodbye." Each of the pages may be identified by a page name that is shown in the Page Name field 201d. In addition or as an alternative to the page name, each page also may be identified by a page number that is shown in the Page # field 201e. The page name and page number of a page are specified by the content provider when creating the pages for the interaction site. A page may have a unique page name, or it may have a page name that is similar to the page name of another page. In case two or more pages share the same page name, they may be differentiated based on the page numbers. The combination of page name and page number uniquely identifies a page. A user may access and modify any of the pages displayed in the page flow 202 by selecting them from the displayed list.

Importantly, a second page that is processed after the processing of a first page may be said to be directly linked to that first page if the first page includes a direct link to the second page without any intervening pages therebetween. Alternatively, a second page may instead be said to be indirectly linked to the first page if that first page is linked to the second page in the interaction flow with one or more pages being processed between the processing of the first page and the processing of the second page.

In other implementations, the Site Overview page 201 may additionally or alternatively present the pages in a two dimensional or three dimensional display that visually depicts the links between the pages. For example, each page may be displayed as a page graphical element, such as, for example, a rectangle or a block, with one or more link graphical elements, such as, for example, lines, connecting the page graphical elements to other page graphical elements to which they are linked. Text may be overlaid on or displayed in proximity to the page and/or line graphical elements to communicate the identity of the corresponding page and/or the nature of the link between the elements.

The content provider may create a new page by clicking the "Add Page" button icon 201f. When the "Add Page" button icon 201f is clicked, a new page is added to the page flow 202. In response to selecting the button icon 201f, the GUI 200 may present a set of page templates for selection in, for example, a drop-down list. The page templates may include, for example, message pages, question pages, logic pages, transaction pages, and multimodal action pages. The user may select a page template from the list to generate a page of the corresponding type using the template. The template presents to the user the necessary fields and/or controls for that page type and the user may populate the fields (e.g., by typing text into the fields) and/or select the controls to generate a page of the corresponding type.

Alternatively, a new page may be created by copying a previously created page. The content provider may select the page to be copied by checking the checkbox to the left of the page to be copied and then selecting the "Copy" button. An existing page can be deleted by checking the checkbox to the left of the page, and then clicking the "Delete" button. The content provider may save the interaction site by clicking the "Save" button 201j. The content provider may save the interaction site and then exit the GUI 201 by clicking the "Save & Exit" button 201g. The content provider may exit the GUI 201 without saving the interaction site by clicking the "Exit" button 201h. The content provider may compile the interaction site by clicking the "Compile" button 201i, where the application compiler 194 may compile the input parameters into an interaction flow document, and may save the interaction flow document in the interaction flow document database 185.

Figure 2B:
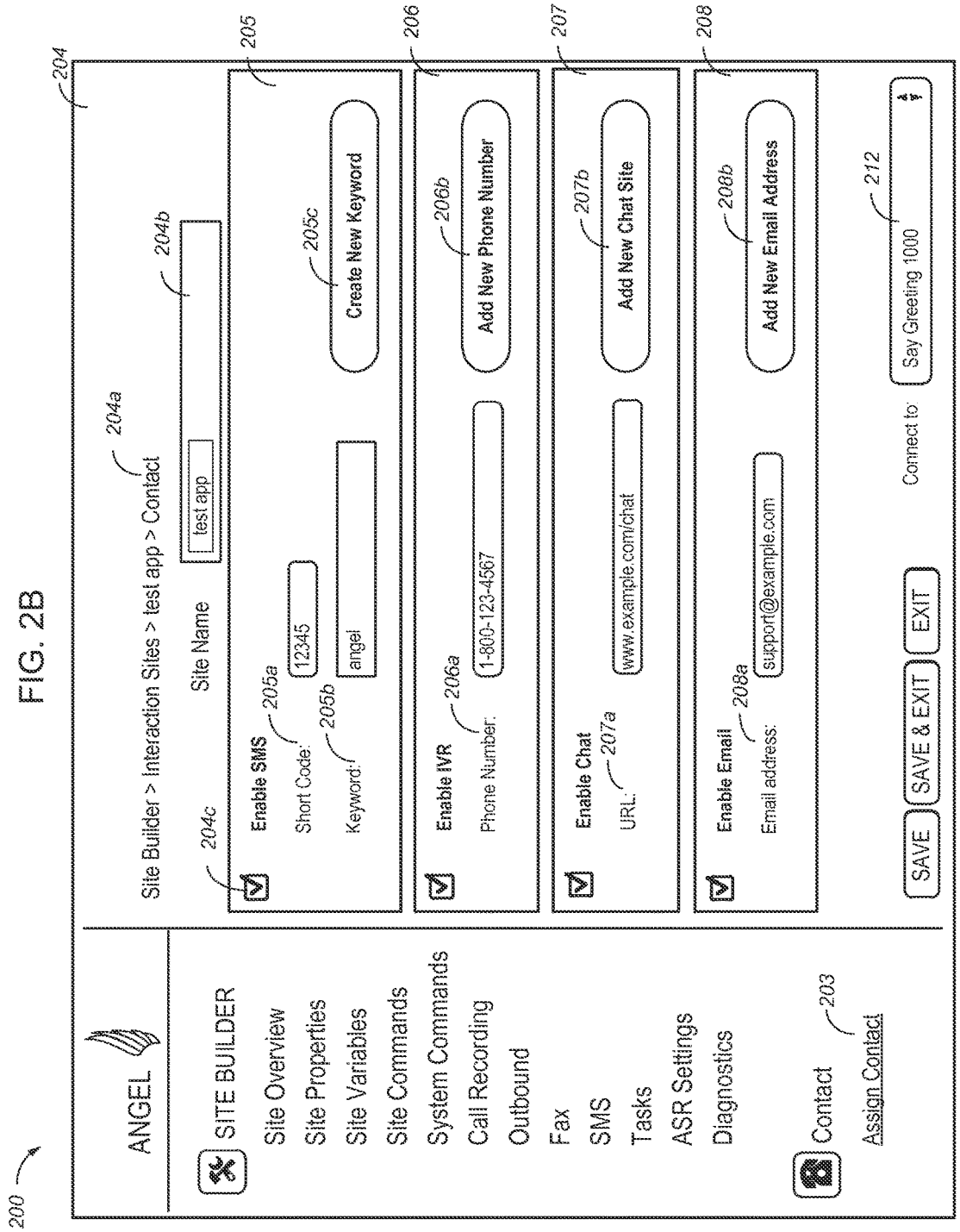

FIG. 2B illustrates an example GUI 204 for defining the contact information for an interaction site. For example, the content provider may click on the "Assign Contact" link 203 to access the Contact page 204. The Contact page 204 is specified by the heading 204a, and the corresponding interaction site is specified by the Site Name field 204b. The Contact page 204 provides a listing of communications channels that users may use to access the interaction site. The content provider may select which communications channels the users may use to access the interaction site by checking or unchecking the checkbox 204c associated with the respective communications channel. For example, the Contact page 204 shows four types of communications channels that may be enabled for the interaction site, namely SMS 205, IVR 206, Chat 207, and Email 208. The content provider may select one or more communications channels that the interaction site will support, and, for each of the selected communications channels, the content provider may enter corresponding contact information to associate the contact information with the interaction site.

For the SMS channel 205, the content provider may enter a Short Code 205a (e.g., "12345") and a Keyword 205b ("angel"), and click the Create New Keyword button 205c to associate the entered short code and the keyword with the interaction site. When the user of the communications device 110 enters the short code and the keyword on the communications device 110, the communications device 110 would communicate with the SMS system 170 and the interaction site would be launched, facilitating SMS message exchanges between the SMS system 170 and the communications device 110.

For the IVR channel 206, the content provider may enter a phone number 206a (e.g., "1-800-123-4567"), and click the Add New Phone Number button 206b to associate the entered phone number with the interaction site. When the user of the communications device 110 calls the phone number, the communications device 110 would communicate with the call handling system 150 and the interaction site would be launched, facilitating voice message exchanges between the IVR system 152 and the communications device 110.

For the chat channel 207, the content provider may enter a URL 207a (e.g., "www.example.com/chat"), and click the Add New Chat Site button 207b to associate the entered URL with the interaction site. When the user of the communications device 110 enters the URL in a browser, the communications device 110 would communicate with the chat system 174 and the interaction site would be launched, facilitating real time chat exchanges between the chat system 174 and the communications device 110.

For the email channel 208, the content provider may enter an email address 208a (e.g., "support@example.com"), and click the Add New Email Address button 208b to associate the entered email address with the interaction site. When the user of the communications device 110 enters the email address in an email application, the communications device 110 would communicate with the email system 172 and the interaction site would be launched, facilitating email exchanges between the email system 172 and the communications device 110.

In the examples above, more types of communications channels may be added to the Contact page 204 depending on the requirements of the interaction sites and the capability of the multi-channel communications system 135. One or more additional parameters may be added or substituted for any of the channels in the examples above. For example, there may be multiple phone numbers (e.g., toll-free and local phone numbers) associated with the IVR channel 206. As another example, in addition to the email address 208a in the email channel 208, the content provider may add a keyword to the subject line of an email to launch a particular interaction site.

The "Connect to" drop-down menu 212 allows the content provider to choose which of the pages in the page flow 202 to be processed when the user of communications device 110 accesses the interaction site using the information in the Contact page. In some implementations, the "Connect to" drop-down menu 212 defines the "Home Page" field 201c in FIG. 2A. Here, the content provider chooses the "Say Greeting" interaction page 1000 as the home page of the interaction site. In some implementations, the user may select a different "connect to" page for different contacts (e.g., an email contact is connected to one page while a chat contact is connected to a different page).

The GUI 200 further includes a display 209 that illustrates all, one or a subset (e.g., all telephone contact points or all email contact points) of the contact points associated with the interaction site. In some implementations, the display 209 shows a list of all of the contact points assigned to the interaction site by the user through interactions with GUI 204. The display 209 may be dynamically updated in response to and as the user interacts with the GUI 204 to add or remove contact points from the display. In the example shown in FIG. 2B, four different contact points have been assigned to the interaction site: (1) A telephone contact point, which is the telephone number "1-800-123-4567;" (2) an SMS contact point, which is the SMS shortcode "12345" and the keyword "Angel;" (3) a chat contact point, which is the universal resource locator (URL) address "www.example.com/chat"; and (4) an email contact point, which is the email address "support@example.com."

Figure 2C:
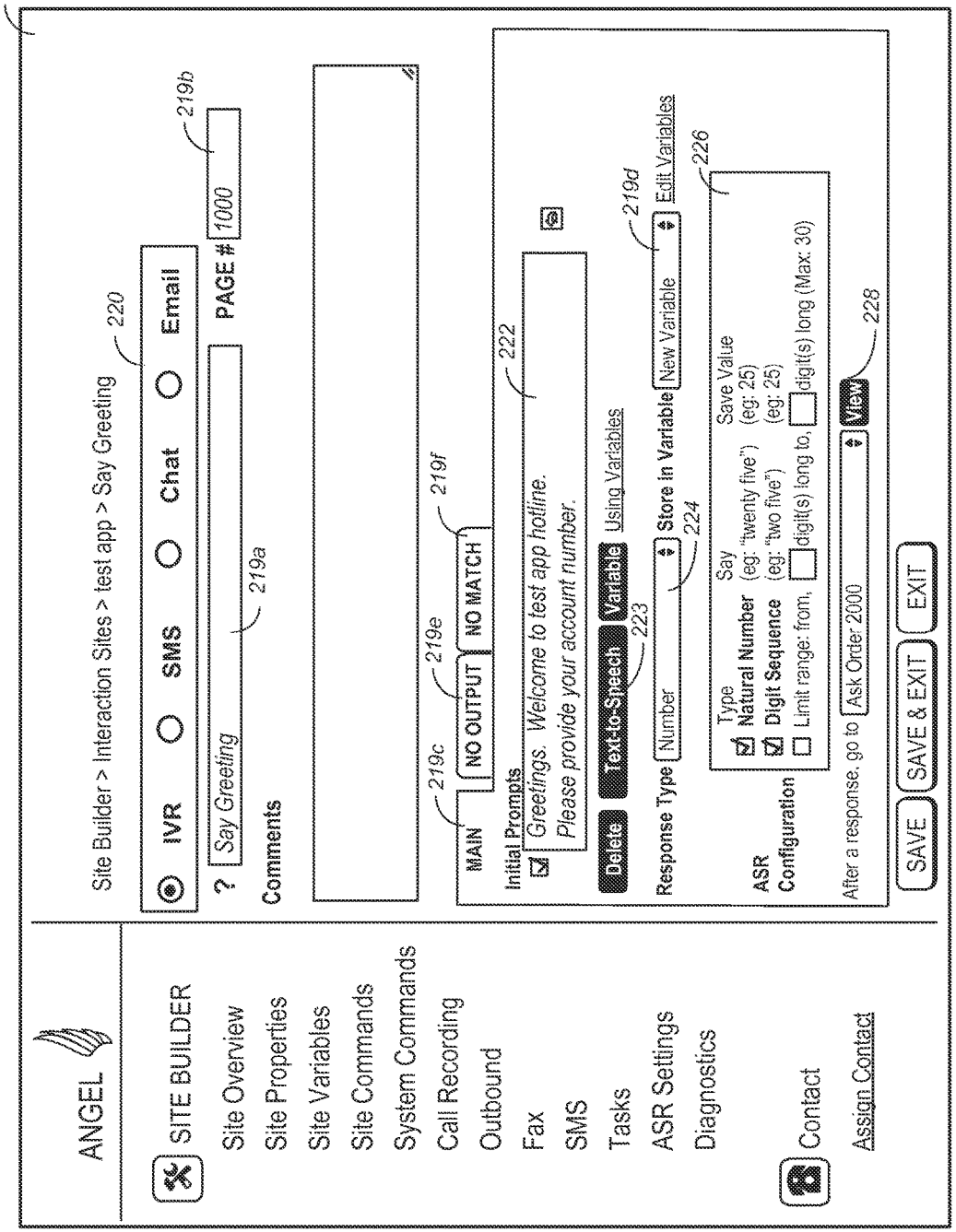

FIG. 2C illustrates an example GUI 219 for configuring an interaction page (specifically, a message page) that is the first page that is processed for the interaction site in the event that the user accesses the interaction site via an IVR channel. The "Say Greeting" interaction page is identified by its page name 219a and/or page number 219b. The page name 219a and the page number 219b correspond to the name of the page shown in the Page Name field 201d and the number of the page shown in the Page # field 201e respectively, shown in the Site Overview page 201. The radio buttons in the group 220 allows the content provider to select a specific communications channel for configuration. In some implementations, the communications channels listed in the group 220 correspond to the enabled communications channels in the Contact page described in FIG. 2B. Here, the IVR channel is selected in the group 220, which indicates that the GUI 219 allows the content provider to input parameters that configure the interaction page for the IVR channel. As described below, some of the input parameters are common for all communications channels, while some of the input parameters are specific for the IVR channel.

The main tab 219c of the interaction page allows the content provider to enter parameters that configure the interaction page for the IVR channel. In some implementations, some of these parameters in the GUI 219 are common for all the enabled communications channels. For example, the "Initial Prompts" parameter 222 allows the content provider to enter information that will be presented to the user independent of the communications channel that the user accesses the interaction page with. The content provider inputs a prompt "Greetings. Welcome to test app hotline. Please provide your account number" in the "Initial Prompts" parameter 222, where this prompt will be shared among all enabled communications channels.

As another example, the "Response Type" parameter 224 is also common across all communications channels. The "Response Type" parameter 224 allows the content provider to specify what type of response the multi-channel communications system 135 may expect the user to provide after the message specified in the "Initial Prompts" parameter 222 is delivered to the user, which allows the content provider to customize the resources to be used to process the received response. Here, the initial prompt asks the user for the account number, and the expected "Response Type" parameter 224 is set to "Number" accordingly. No matter which communications channel the user is using, the multi-channel communications system 135 expects to receive a response that consists of numbers. Therefore, the content provider only needs to set up the "Response Type" parameter 224 one time, and it will be applied to all communications channels. In some implementations, the received information may be stored in a variable 219d "New Variable" as specified by the "Store in Variable" drop-down menu, where the variable 219d may be selected from a list of variables previously specified by the content provider. The variable 219d stores the account number specified by the user and processed by the multi-channel communications system 135. In some implementations, the value of the variable 219d may be stored in the data store 160.

As another example, the subsequent page parameter 228 is also common across all communications channels. The subsequent page parameter 228 includes a pull-down menu that allows the content provider to specify which page is to be provided to the user after the multi-channel communications system 135 receives a response. In some implementations, the pages included in the pull-down menu reference to the pages in the page flow 202 defined by the content provider.

In some implementations, some of these parameters in the GUI 219 are specific for the IVR channel. In some implementations, these specific parameters only appear in the GUI

219 after the content provider selects the radio button that corresponds to the IVR channel in the group 220. For example, if the content provider clicks on the "Text-to-Speech" button 223, another GUI (not shown) may be provided to the content provider, which enables the content provider to configure parameters that are related to the automated speech (e.g., gender, pitch, speed, etc.) converted from the text specified in the "Initial Prompts" parameter 222.

As another example, the auto speech recognition (ASR) configuration graphical element 226 allows the content provider to input parameters that are specific to an IVR. Here, the GUI 219 allows the content provider to specify what types of numerical response may be expected from the user by checking the checkbox associated with the type of numerical response. The "Natural Number" type has been selected, which would utilize an ASR that is capable of converting a natural number response (e.g., "twenty five") into a numerical number (e.g., 25) that can be subsequently processed or stored. The "Digit Sequence" type has also been selected, which would utilize an ASR that is capable of converting a digit sequence response (e.g., "two five") into a numerical number (e.g., 25) that can be subsequently processed or stored. The content provider may also limit the range of the numerical number of the user, which is useful in situations where the number of digits are fixed (e.g., credit card numbers).

The "No Output" tab 219e of the interaction page allows the content provider to enter parameters that configure the interaction page for the IVR channel in the case where there is no response received from the user. Similar to the main tab 219c, some parameters in the "No Output" tab 219e are common for all communications channels, and some parameters in the "No Output" tab 219e are specific for the IVR channel. The "No Match" tab 219f of the interaction page allows the content provider to enter parameters that configure the interaction page for the IVR channel in the case where the received response does not match the response type as specified by the "Response Type" parameter 224. Similar to the main tab 219c, some parameters in the "No Match" tab 219f are common for all communications channels, and some parameters in the "No Match" tab 219f are specific for the TVR channel.

The examples describe above for the IVR channel are not limiting. A GUI for developing an interaction page used in an IVR communications environment may have more or fewer configurable parameters that are shared among various communications channels or are specific for the IVR channel than the GUI 219 described in FIG. 2C.

Figure 2D:
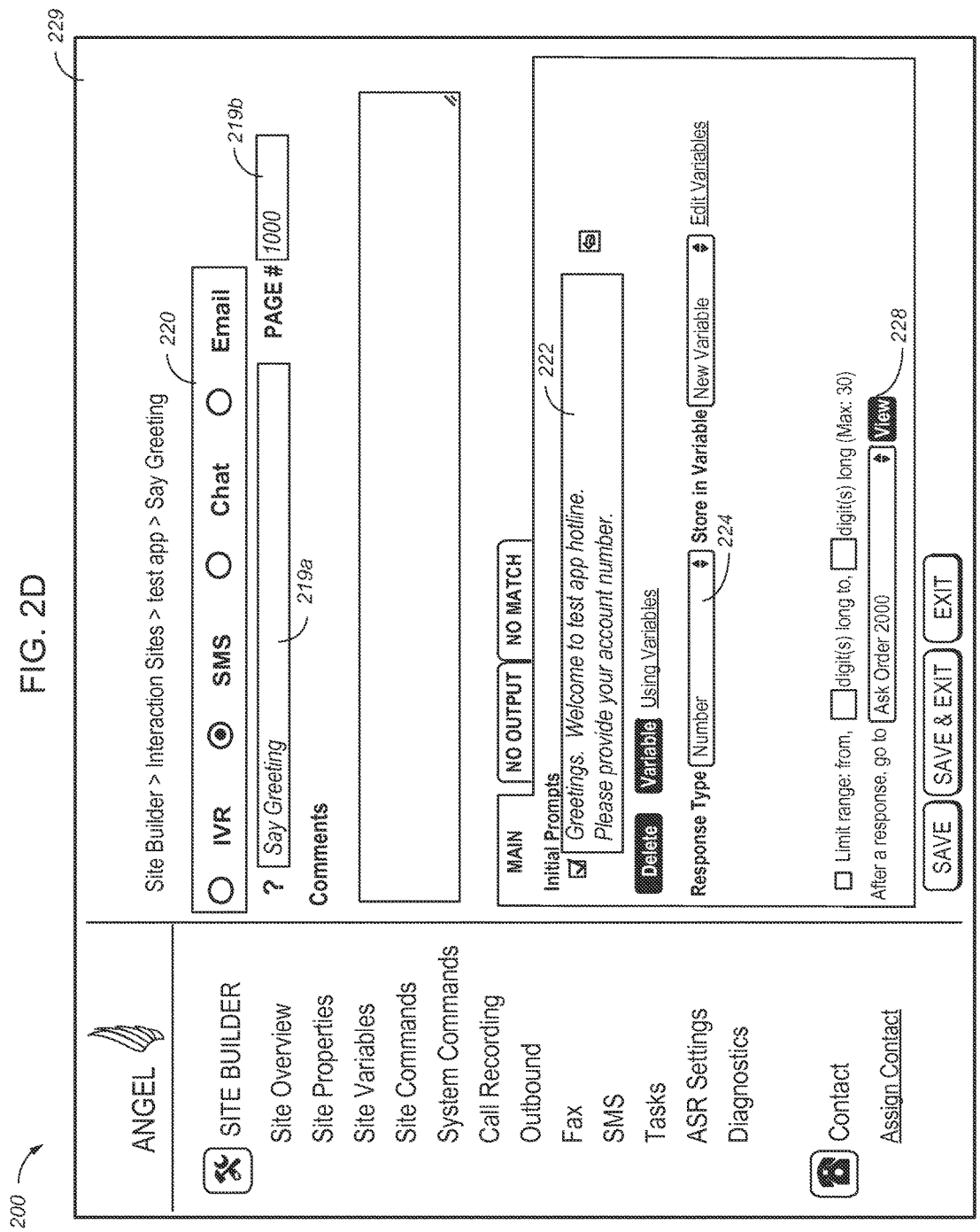

FIG. 2D illustrates an example GUI 229 for configuring an interaction page (specifically, a message page) that is the first page that is processed for the interaction site in the event that the user accesses the interaction site via a SMS channel. The SMS channel is selected in the group 220, which indicates that the GUI 229 allows the content provider to input parameters that configure the interaction page for the SMS channel. The content provider does not need to input again values for the parameters common for all communications channels, for example the "Initial Prompts" parameter 222, the "Response Type" parameter 224, and the subsequent page parameter 228, because these values have been provided by the content provider in the GUI 219 for the IVR channel. Moreover, the parameters that are specific for the IVR channel, for example the "Text-to-Speech" button 223 and the auto speech recognition (ASR) configuration 226, would not be displayed to the content provider because the GUI 229 is for configuring the interaction page accessed via the SMS channel. In some implementations, the display of the SMS message to users is dependent on the settings of the communications device 110, and the content provider does not need to provide additional parameters associate with the GUI 229.

The examples describe above for the SMS channel are not limiting. A GUI for developing an interaction page used in a SMS communications environment may have more or fewer configurable parameters that are shared among various communications channels or are specific for the SMS channel than the GUI 229 described in FIG. 2D.

Figure 2E:
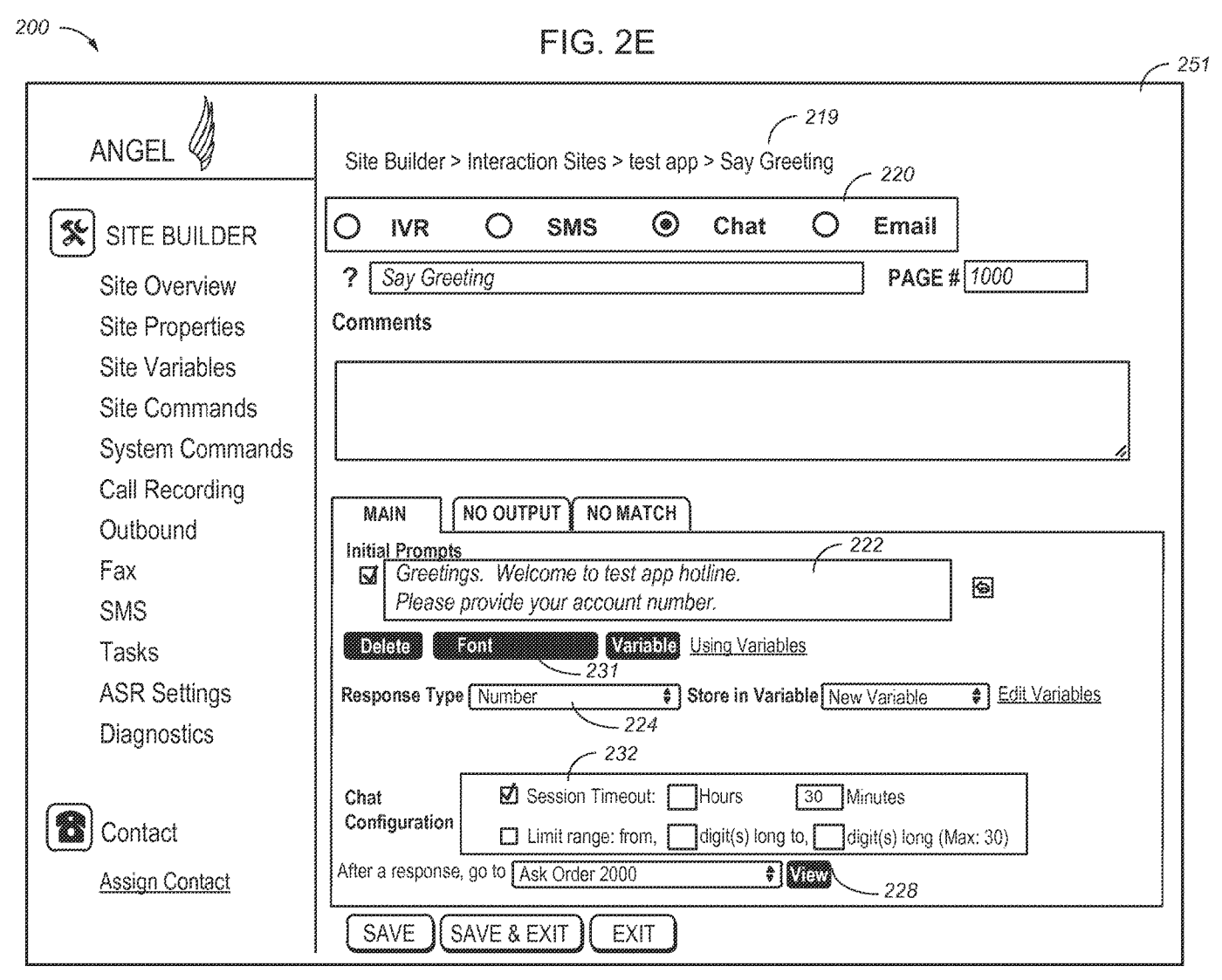

FIG. 2E illustrates an example GUI 251 for configuring an interaction page (specifically, a message page) that is the first page that is processed for the interaction site in the event that the user accesses the interaction site via a chat channel. The chat channel is selected in the group 220, which indicates that the GUI 251 allows the content provider to input parameters that configure the interaction page for the chat channel. The content provider does not need to input values for the parameters common for all communications channels because these values have been provided by the content provider in the GUI 219 for the IVR channel. Moreover, the parameters that are specific for the other channel types would not be displayed to the content provider.

In some implementations, some of the parameters in the GUI 251 are specific for the chat channel. In some implementations, these specific parameters only appear in the GUI 251 after the content provider selects the radio button that corresponds to the chat channel in the group 220. For example, if the content provider clicks on the "Font" button 231, another GUI (not shown) may be provided to the content provider, which enable the content provider to configure parameters that are related to how (e.g., font, size, color, etc.) the text specified in the "Initial Prompts" parameter 222 will be presented to the user. As another example, the chat configuration 232 allows the content provider to input parameters that are specific to a chat session. Here, the GUI 251 allows the content provider to select and specify a value (e.g., 30 minutes) for session timeout, which will terminate the chat session in the event that the user does not respond within the specified time.

The examples describe above for the chat channel are not limiting. A GUI for developing an interaction page used in a chat communications environment may have more or fewer configurable parameters that are shared among various communications channels or are specific for the chat channel than the GUI 251 described in FIG. 2E.

Figure 2F:
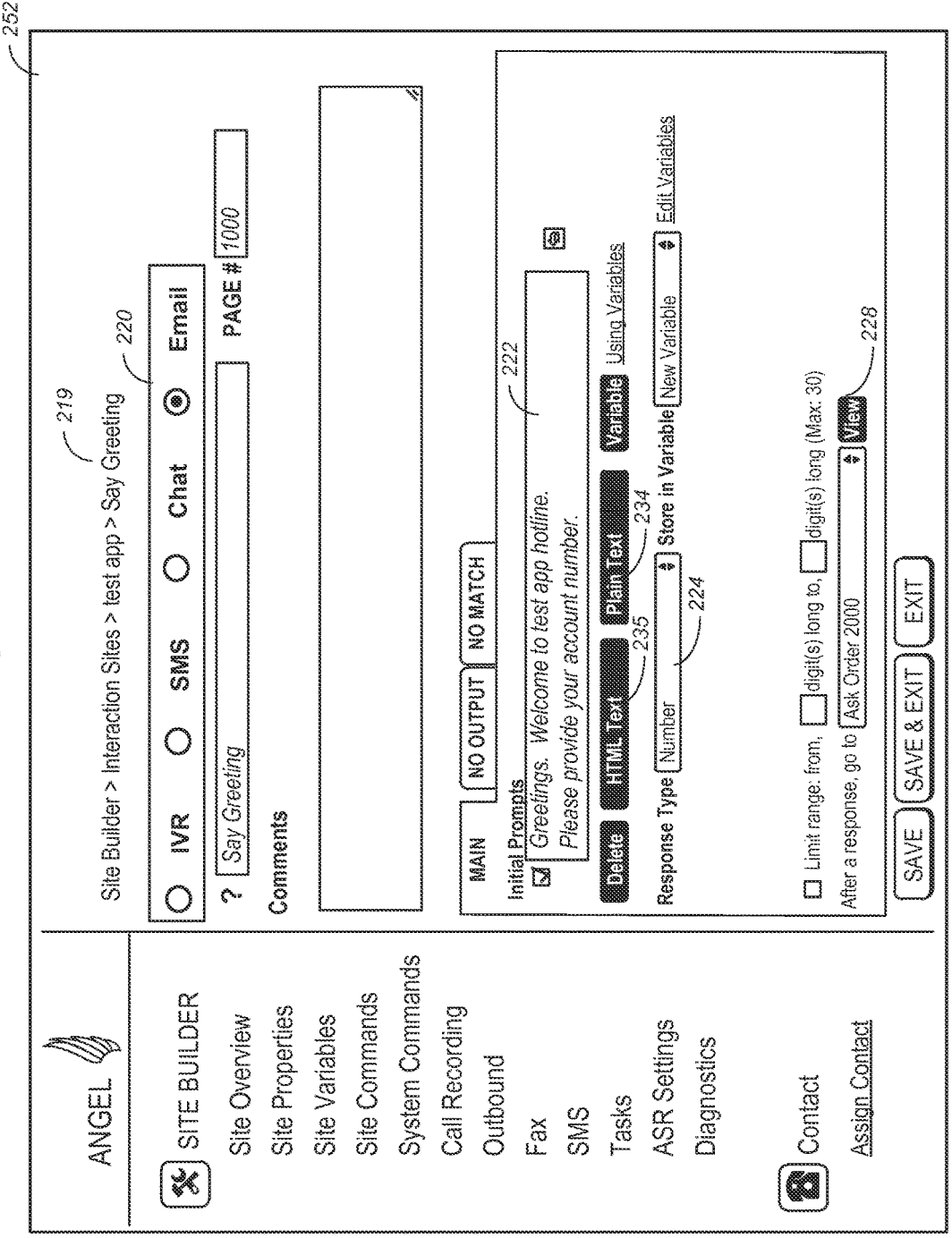

FIG. 2F illustrates an example GUI 252 for configuring an interaction page (specifically, a message page) that is the first page that is processed for the interaction site in the event that the user accesses the interaction site via an email channel. The email channel is selected in the group 220, which indicates that the GUI 252 allows the content provider to input parameters that configure the interaction page for the email channel. The content provider does not need to input values for the parameters common for all communications channels because these values have been provided by the content provider in the GUI 219 for the IVR channel. Moreover, the parameters that are specific for the other channel types would not be displayed to the content provider.

In some implementations, some of the parameters in the GUI 252 are specific for the email channel. In some implementations, these specific parameters only appear in the GUI 252 after the content provider selects the radio button that corresponds to the email channel in the group 220. For example, if the content provider clicks on the "HTML Text" button 235, another GUI (not shown) may be provided to the content provider, which enables the content provider to configure Hyper-Text Markup Language (HTML) text and tags that are related to how the text specified in the "Initial Prompts" parameter 222 will be presented to the user in an email. As another example, if the content provider clicks on the "Plain Text" button 234, the text specified in the "Initial Prompts" parameter 222 will be presented to the user in plain text in the email.

The examples describe above for the email channel are not limiting. A GUI for developing an interaction page used in an email communications environment may have more or fewer configurable parameters that are shared among various communications channels or are specific for the email channel than the GUI 252 described in FIG. 2F.

Figure 2G:
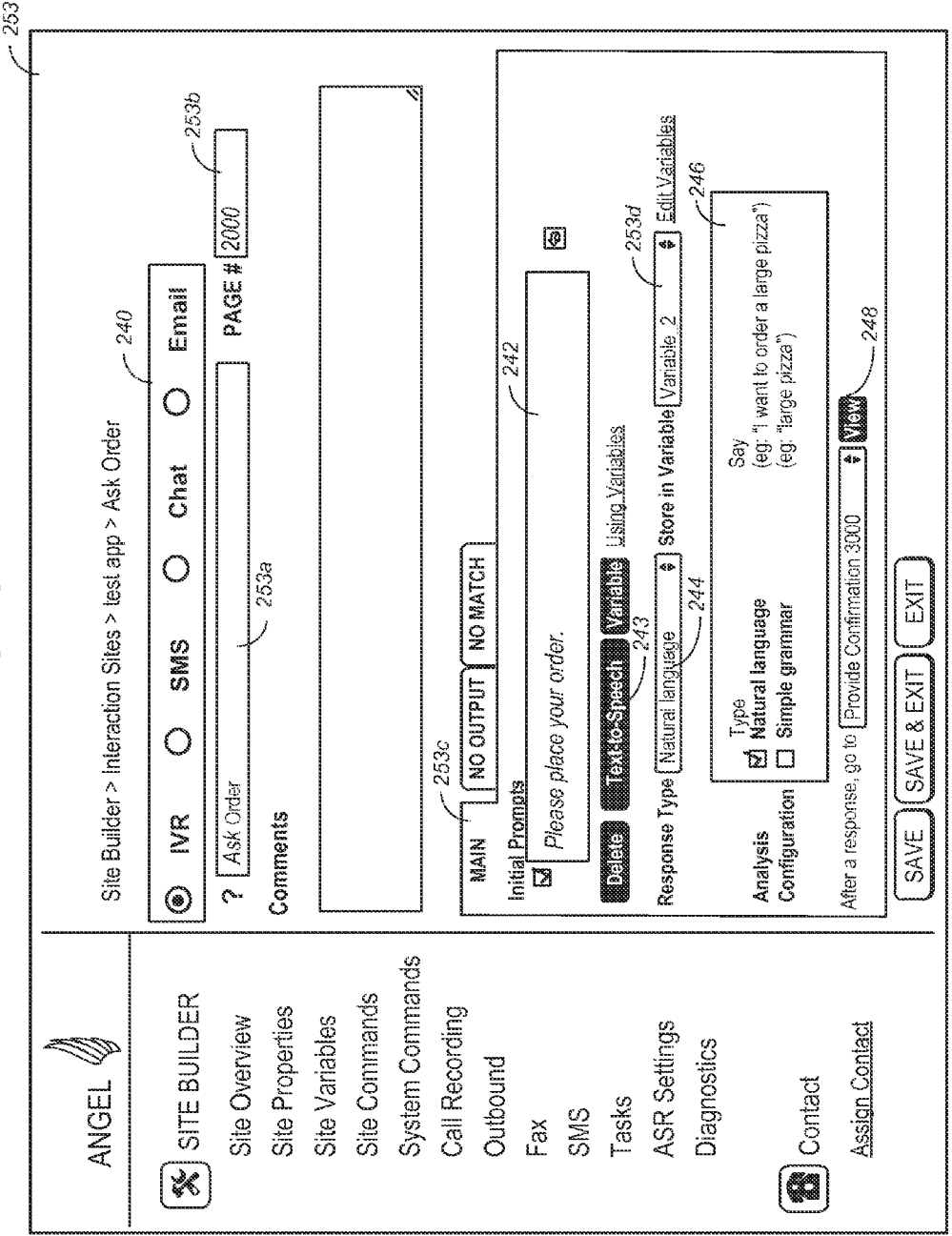

FIG. 2G illustrates an example GUI 253 for configuring an interaction page (specifically, a message page) that is the second page that is processed for the interaction site in the event that the user accesses the interaction site via an IVR channel. The "Ask Order" interaction page is identified by its page name 253a and/or page number 253b. The page name 253a and the page number 253b correspond to the name of the page shown in the Page Name field 201d and the number of the page shown in the Page # field 201e respectively, shown in the Site Overview page 201. The radio buttons in the group 240 allows the content provider to select a specific communications channel for configuration. In some implementations, the communications channels listed in the group 240 correspond to the enabled communications channels in the Contact page described in FIG. 2B.

The main tab 253c of the interaction page allows the content provider to enter parameters that configure the interaction page for the IVR channel, Similar to the descriptions in FIG. 2C, some of these parameters in the GUI 253 are common for all the enabled communications channels. For example, the "Initial Prompts" parameter 242 allows the content provider to enter information that will be presented to the user independent of the communications channel that the user accesses the interaction page with. The content provider inputs a prompt "Please place your order" in the "Initial Prompts" parameter 222, where this prompt will be shared among all enabled communications channels.

As another example, the "Response Type" parameter 244 is also common across all communications channels. Here, the initial prompt asks the user for the order, and the expected "Response Type" parameter 244 is set to "Natural language" accordingly. No matter which communications channel the user is using, the multi-channel communications system 135 expects to receive a response that consists of words and/or numbers that represent an order. Therefore, the content provider only needs to set up the "Response Type" parameter 244 one time for this interaction page, and it will be applied to all communications channels. In some implementations, the selection of a particular response type may cause the application builder 190 to automatically select a resource for a particular communications channel. For example, by selecting "Natural language," the application builder 190 may automatically assign an ASR engine that is capable of recognizing spoken responses with complex grammars to the IVR. In some implementations, the received information may be stored in a variable 253d "Variable_2" as specified by the "Store in Variable" drop-down menu.

As another example, the subsequent page parameter 248 is also common across all communications channels. Here, the subsequent page parameter 248 is set to the "Provide Confirmation" page, which has a page number of "3000."

As another example, the analysis configuration 246 allows the content provider to input parameters for analyzing the received feedback common for all communications channel types. Here, the GUI 253 allows the content provider to specify what types of response may be expected from the user by checking the checkbox associated with the response. The "Natural language" type has been selected, which would utilize an analytic resource that is capable of interpreting user feedback with complex grammars (e.g., "I want to order a large pizza") that can be subsequently processed or stored. The "Simple grammar" type has not been selected because the content provider may not expect a simple response from the user (e.g., "large pizza.").

In some implementations, some of these parameters in the GUI 253 are specific for the IVR channel. In some implementations, these specific parameters only appear in the GUI 253 after the content provider selects the radio button that corresponds to the IVR channel in the group 220. For example, if the content provider clicks on the "Text-to-Speech" button 243, another GUI (not shown) may be provided to the content provider, which enable the content provider to configure parameters that are related to the automated speech (e.g., gender, pitch, speed, etc.) converted from the text specified in the "Initial Prompts" parameter 242.

The examples describe above for the IVR channel are not limiting. A GUI for developing an interaction page used in an IVR communications environment may have more or fewer configurable parameters that are shared among various communications channels or are specific for the IVR channel than the GUI 253 described in FIG. 2G.

Figure 2H:
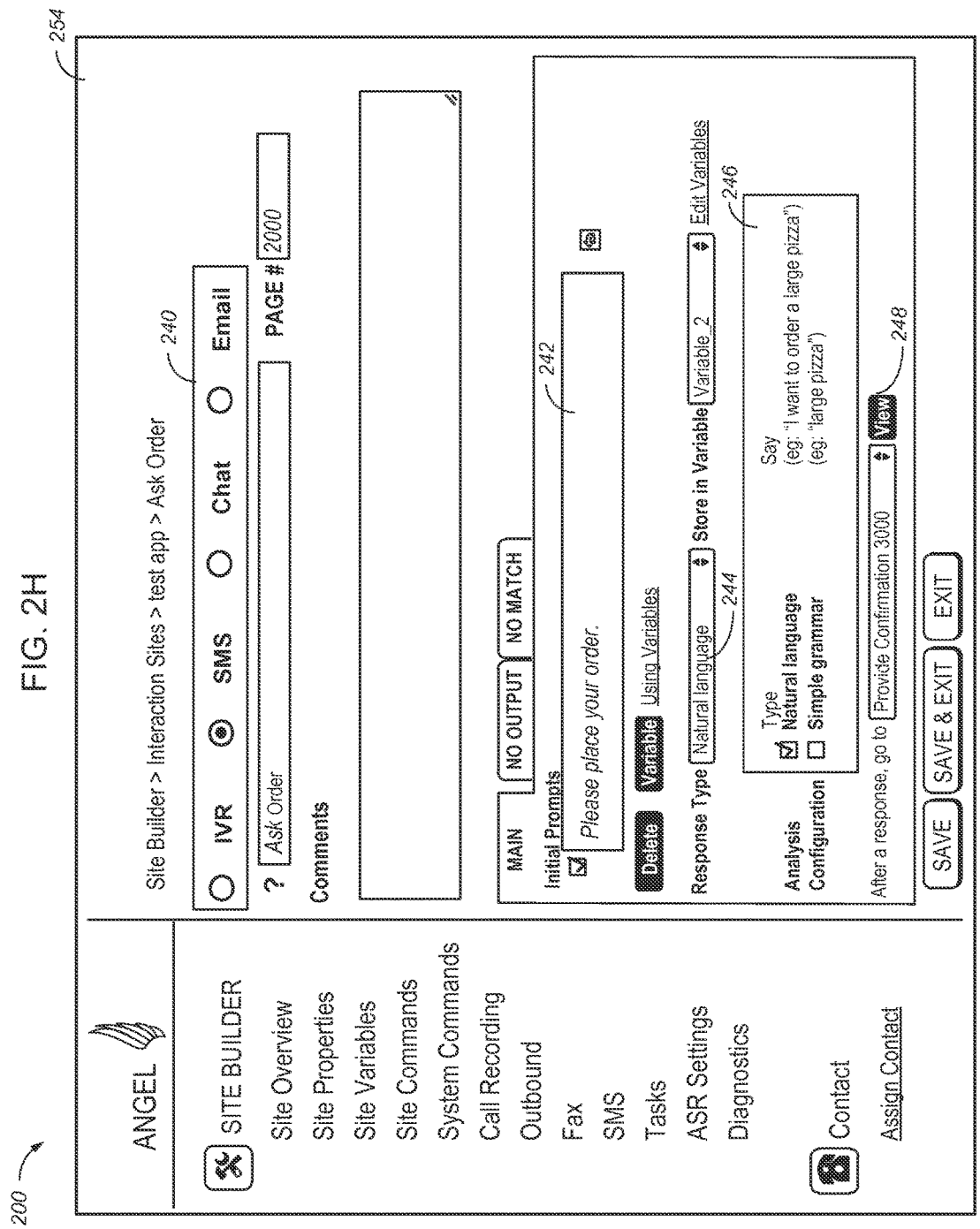
Figure 21:
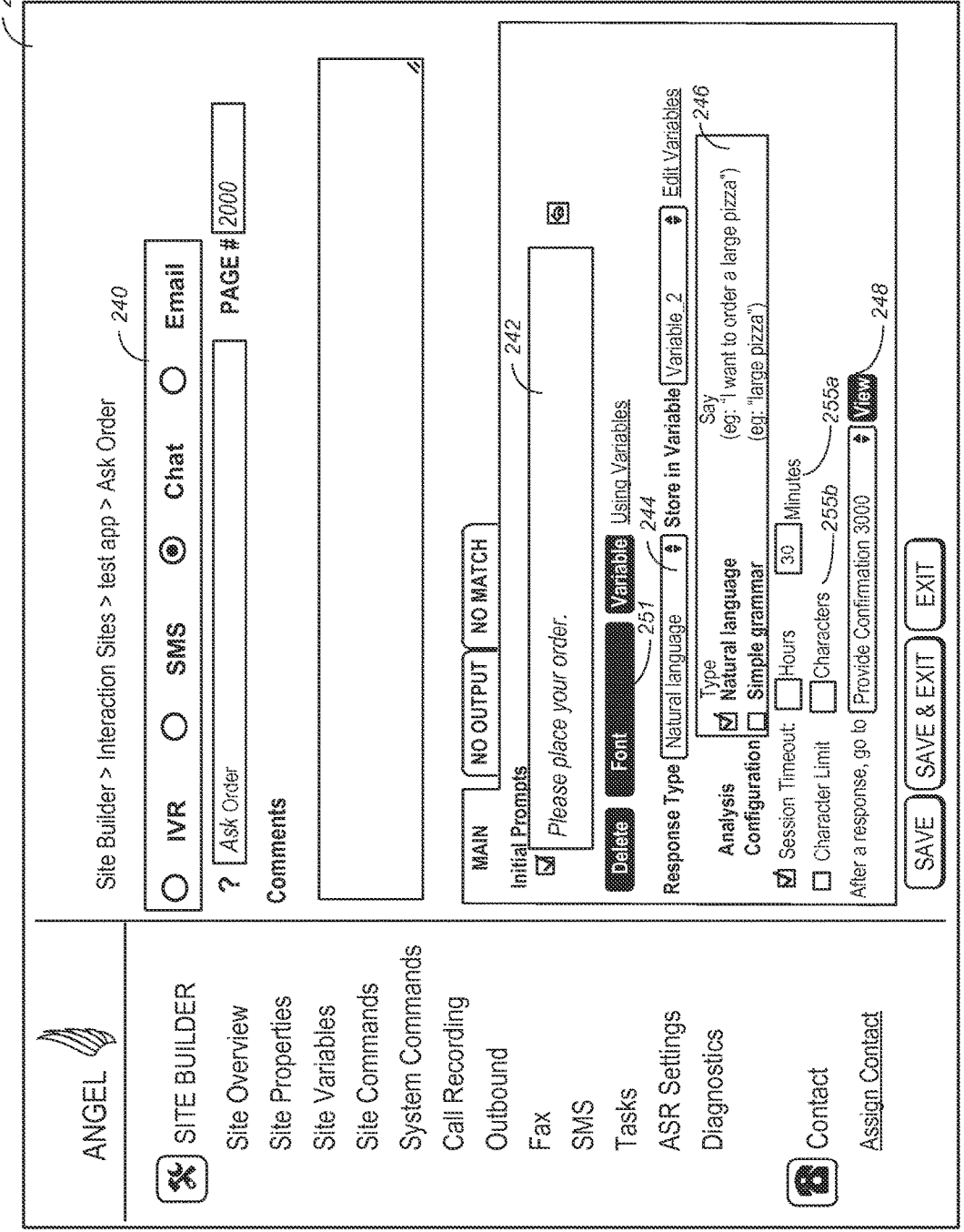

FIG. 2H illustrates an example GUI 254 for configuring an interaction page (specifically, a message page) that is the second page that is processed for the interaction site in the event that the user accesses the interaction site via a SMS channel. The SMS channel is selected in the group 240, which indicates that the GUI 254 allows the content provider to input parameters that configure the interaction page for the SMS channel. The content provider does not need to input again values for the parameters common for all communications channels, for example the "Initial Prompts" parameter 242, the "Response Type" parameter 244, the "Analysis Configuration" parameter 246, and the subsequent page parameter 248, because these values have been provided by the content provider in the GUI 253 for the IVR channel. Moreover, the parameters that are specific for the IVR channel, for example the "Text-to-Speech" button 243, would not be displayed to the content provider because the GUI 253 is for configuring the interaction page accessed via the SMS channel.

The examples describe above for the SMS channel are not limiting. A GUI for developing an interaction page used in a SMS communications environment may have more or fewer configurable parameters that are shared among various communications channels or are specific for the SMS channel than the GUI 254 described in FIG. 2H.

FIG. 2I illustrates an example GUI 255 for configuring an interaction page (specifically, a message page) that is the second page that is processed for the interaction site in the event that the user accesses the interaction site via a chat channel. The chat channel is selected in the group 240, which indicates that the GUI 255 allows the content provider to input parameters that configure the interaction page for the chat channel. The content provider does not need to input values again for the parameters common for all communications channels because these values have been provided by the content provider in the GUI 253 for the IVR channel. Moreover, the parameters that are specific for the other channel types would not be displayed to the content provider.

In some implementations, some of the parameters in the GUI 255 are specific for the chat channel. In some implementations, these specific parameters only appear in the GUI 255 after the content provider selects the radio button that corresponds to the chat channel in the group 240. For example, if the content provider clicks on the "Font" button 251, another GUI (not shown) may be provided to the content provider, which enable the content provider to configure parameters that are related to how (e.g., font, size, color, etc.) the text specified in the "Initial Prompts" parameter 242 will be presented to the user. As another example, the chat configuration 255a allows the content provider to input parameters that are specific to a chat session. Here, the GUI 255 allows the content provider to select and specify a value (e.g., 30 minutes) for session timeout, which will terminate the chat session in the event that the user does not respond within the specified time.

In some implementations, these specific parameters only appear in the GUI 255 after the content provider selects the radio button that corresponds to the chat channel in the group 240 and selects "Natural language" as the response type 244. For example, the "Character Limit" parameter 255b allows the content provider to limit the number of characters the user can type in the chat room for the response, and the "Character Limit" parameter 255b appears only after the content provider selects "Natural language" as the response type 244 for the chat channel.

The examples describe above for the chat channel are not limiting. A GUI for developing an interaction page used in a chat communications environment may have more or fewer configurable parameters that are shared among various communications channels or are specific for the chat channel than the GUI 255 described in FIG. 2I.

Figure 2J:
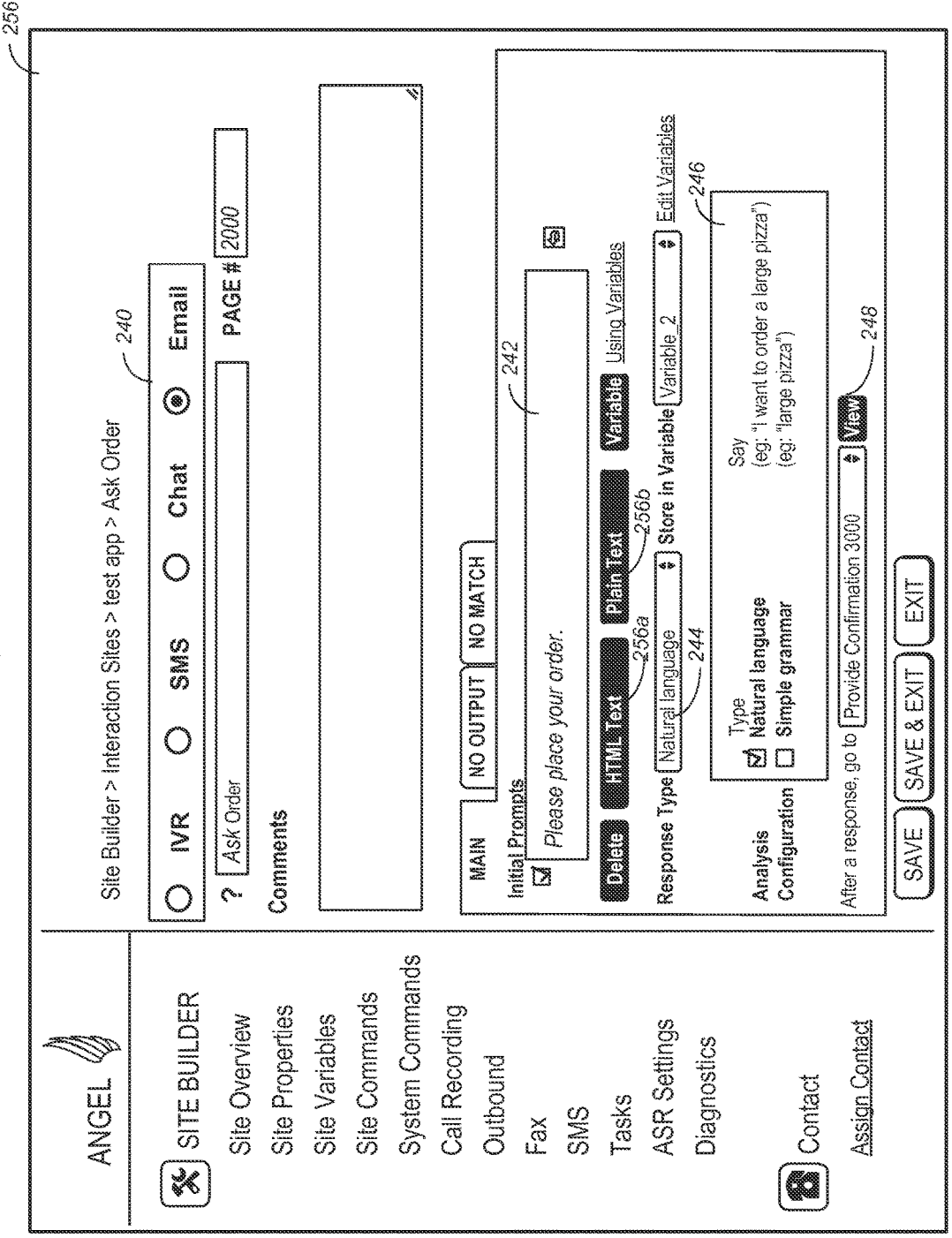

FIG. 2J illustrates an example GUI 256 for configuring an interaction page (specifically, a message page) that is the second page that is processed for the interaction site in the event that the user accesses the interaction site via an email channel. The email channel is selected in the group 240, which indicates that the GUI 256 allows the content provider to input parameters that configure the interaction page for the email channel. The content provider does not need to input values for the parameters common for all communications channels because these values have been provided by the content provider in the GUI 253 for the IVR channel. Moreover, the parameters that are specific for the other channel types would not be displayed to the content provider.

In some implementations, some of the parameters in the GUI 256 are specific for the email channel. In some implementations, these specific parameters only appear in the GUI 256 after the content provider selects the radio button that corresponds to the email channel in the group 240. For example, if the content provider clicks on the "HTML Text" button 256a, another GUI (not shown) may be provided to the content provider, which enables the content provider to configure Hyper-Text Markup Language (HTML) text and tags that are related to how the text specified in the "Initial Prompts" parameter 242 will be presented to the user in an email. As another example, if the content provider clicks on the "Plain Text" button 256b, the text specified in the "Initial Prompts" parameter 242 will be presented to the user in plain text in the email.

The examples describe above for the email channel are not limiting. A GUI for developing an interaction page used in an email communications environment may have more or fewer configurable parameters that are shared among various communications channels or are specific for the email channel than the GUI 256 described in FIG. 2J.

While the pages shown in FIGS. 2C-2J are all messages pages, other page types of the interaction site may similarly be used to configure parameters for multiple different communications channels. For example, question pages and multimodal action pages may present configurable parameters that include common parameters generic to all communications channels and, in some implementations, may additionally include channel-specific parameters. In some implementations, some page types, such as, for example, logic pages and transaction pages, are always generic to all communication channels. In other implementations, logic pages and transaction pages include configurable parameters that are generic to all communications channels and also include configurable parameters that are channel-specific.

FIG. 3 is a flow chart illustrating an example of a process 300 for a content provider to create and host an interaction site. In general, the process 300 provides a content provider an interface to design and create an interaction site that may be accessed in a multi-channel solution platform. The process 300 is described as being performed by a computer system comprising one or more computers, for example, the communications system 100 shown in FIG. 1.

The application builder 190 provides to the content provider system 142 a content provider interface for developing an interaction site executable by a user device to communicate with a server using any one of multiple communications channels (301).

The content provider system 142 creates an interaction site using the content provider interface (303). The application builder 190 may include a content provider interface 192. The content provider interface 192 is a GUI front-end for an application development tool that can be used to build an interaction site that is capable of handling interactions using multiple communications channels. The content provider may access the content provider interface 192 over the data network 130.

The content provider system 142 inputs contact data for each of the enabled multiple communications channels (305). For example, the application builder 190 may provide a GUI similar to the GUI 204 in FIG. 2B, which allows the content provider to define the contact information for an interaction site. The application builder 190 may provide a listing of communications channels of which the content provider may select to identify the communications channels the users may use to access the interaction site. The application builder 190 may provide a GUI for the content provider to input the contact information corresponding to each of the enabled communications channels (e.g., an email address for an email channel, or a telephone number for a telephone contact channel.

The content provider system 142 determines whether the content provider has finished defining pages of the interaction site (307). For example, the application builder 190 may provide a GUT similar to the GUT 201 in FIG. 2A, which allows the content provider to add, edit, or remove one or more pages of an interaction site. The pages may include, for example, any or all of the previously mentioned pages, including message pages, question pages, logic pages, and transaction pages. Examples of other page types that may be used for the interaction site include call queue pages, which are configured to interact with external data sources in order to pull or push relevant data and call transfer pages, which are configured to transfer the call to designated contact point (e.g., phone number). If the content provider has not finished defining the pages of the interaction site, the content provider selects a page from among the site's existing pages to edit (e.g., by modifying the page or deleting the page) or generates a new page (309).

The content provider inputs page data for the selected or new page (311). For example, the application builder 190 may provide a GUI similar to the GUI 219 in FIG. 2C for configuring an interaction page that is the first page processed for the interaction site for an WR channel. Some of the parameters input by the content provider are common for all enabled communications channels, and the content provider will not need to input these parameters again for other communications channels. Optionally, the content provider inputs channel-specific data for the selected or new page (313). For example, some of the parameters in the GUI 219 in FIG. 2C are specific for the IVR channel. When the content provider wishes to edit the interaction page for another communications channel, the application builder 190 may provide another GUI similar to the GUI 229 in FIG. 2D for configuring the first page processed for the interaction site for a SMS channel.

If the content provider has finished defining the pages of the interaction site, the application builder 190 generates an interaction flow document including data defining the interaction site based on the contact data and the page data for the multiple communications channels (315). In some implementations, the application builder 190 may generate an interaction flow document, which may include XML scripts that correspond to pages (e.g., interaction pages) of an interaction site created by the content provider via the content provider interface.

The application builder 190 then stores the interaction flow document at the interaction flow document database 185 (317). The interaction flow document database 185 stores interaction flow documents created by the application builder 190, and provides the interaction flow processor 180 access to these interaction flow documents.

FIG. 4 is a flow chart illustrating an example of a process 400 for a user to communicate with a multi-channel communications system and access an interaction site via a communications channel. In general, the process 400 provides a communications device access to an interaction site using a communications channel of a user's choice. The process 400 is described as being performed by a computer system comprising one or more computers, for example, the communications system 100 shown in FIG. 1

The communications device 110 sends a request to access an interaction site via a particular communications channel (401). A user of the communications device (e.g., a smart phone) 110 is able to interact with the communications device 110 to request a service from an interaction site that is provided by a content provider using a communications channel. For example, the user may indicate a desire to request a service by contacting the multi-channel communications system 135 in any of multiple different ways. For example, the user may call a telephone number, send an SMS message, enter into a chat session, or send an email.

The multi-channel communications system 135 receives the request from communications device 110, and sends a request to the interaction flow processor 180 to obtain code for initiating the interaction site (403). Depending on the communications channel the communications device 110 is using, the request is received by a handling system in the multi-channel communications system 135. For example, if the user of the communications device 110 calls a phone number to reach the interaction site, the call handling system 150 will receive the phone call. Based on the contact information received by the multi-channel communications system 135, the corresponding handling system sends a request to the interaction flow processor 180 for the scripts for executing the interaction site. The request sent by the multi-channel communications system 135 to the interaction flow processor 180 may include an interaction site identifier (e.g., a unique interaction site identifier) that may be used by the interaction flow processor 180 to identify the desired interaction site. In some implementations, the multi-channel communications system 135 may send a request for the scripts for executing the entire flow of the interaction site. In other implementations, the multi-channel communications system 135 may send a request for the scripts for executing a particular state of the flow (e.g., a state corresponding to executing a single page or executing a subset of the pages of the interaction site), rather than the entire flow.

The interaction flow processor 180 identifies the communications channel used by the user to contact the system (405). In some implementations, the communications channel may be included in the request sent by the multi-channel communications system 135. In some implementations, the communications channel may be determined by the interaction flow processor 180 based on the identifier of the handling system. For example, the identifier may be an IF address of the handling system. As another example, the identifier may be metadata embedded in the request to the interaction flow processor 180.

The interaction flow processor 180 accesses the interaction flow document for the interaction site (407). Based on the interaction site that the multi-channel communications system 135 has requested, the interaction flow processor 180 accesses the interaction flow document stored in the interaction flow document database 185. The interaction flow document database 185 then provides the common code for the interaction site (409). In some implementations, the common code may be XML scripts.

The interaction flow processor 180 translates the common code to code specific to the determined communications channel (411). Based on the communications channel that the communications device 110 is using, the interaction flow processor 180 translates the scripts in the interaction flow document to a specific language that the handling system can execute. For example, if the handling system is the call handling system 150, the interaction flow processor 180 translates the scripts from XML scripts to VoiceXML scripts. In some implementations, the translation may include adding parameters specific to a type of communications channel in the translated scripts. For example, if the handling system is the call handling system 150, the interaction flow processor 180 may add information specific to ASR resource selection in the translated scripts. The interaction flow processor 180 then transmits the translated code that is specific to the determined communications channel to the multi-channel communications system 135 (413).

The multi-channel communications system 135 executes code specific to the determined communications channel to initiate the interaction site between the multi-channel communications system 135 and the communications device 110 (415). The communications device 110 then interacts with the interaction site via the communications channel (417). Notably, if the interaction site is an enhanced interaction site (i.e., a site that includes one or more multimodal action pages), the communication device 110 may interact with the interaction site via the standard communications mode (e.g., text) of the communications channel (e.g., chat) and, in at least some portions of the interaction flow, via one or more additional communication modes (e.g., video and audio). As stated previously, multimodal action pages are described in greater detail in application Ser. No. 13/092,090, which is incorporated herein by reference for all purposes.

The disclosed and other examples can be implemented as one or more computer program products, i.e., one or more modules of computer program instructions encoded on a computer readable medium for execution by, or to control the operation of, data processing apparatus. The implementations can include single or distributed processing of algorithms. The computer readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A system may encompass all apparatus, devices, and machines for processing data, including by way of example a programmable processor, a computer, or multiple processors or computers. A system can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communications network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer can include a processor for performing instructions and one or more memory devices for storing instructions and data. Generally, a computer can also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data can include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document may describe many specifics, these should not be construed as limitations on the scope of an invention that is claimed or of what may be claimed, but rather as descriptions of features specific to particular embodiments. For example, a communications channel may include the Web, where a user may interact with an interaction site via a webpage generated dynamically according to the interaction flow. As another example, a communications channel may include a smart phone application, where a user may interact with an interaction site by starting a smart phone application, and the smart phone application then contacts the interaction site and provides a communications interface between the user and the interaction site. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A computer-implemented method, comprising:
   receiving, by a processor, a first interaction request via a first communications channel for engaging in a first communication with a user device;
   retrieving, by the processor, an interaction flow document in response to the first interaction request, the interaction flow document including instructions for processing interactions over a plurality of different communications channels;
   translating, by the processor, the instructions of the retrieved interaction flow document to first instructions compatible with the first communications channel;
   executing, by the processor, the first instructions for engaging in communication with the user device over the first communications channel;
   receiving, by the processor, a second interaction request via a second communications channel, the second communications channel being different from the first communications channel;

retrieving, by the processor, the interaction flow document in response to the second request;

translating, by the processor, the instructions of the retrieved interaction flow document to second instructions compatible with the second communications channel; and executing, by the processor, the second instructions for engaging in communication with the user device over the second communications channel.

2. The method of claim 1 further comprising determining, by the processor, at least one of the first or second communications channel based on an identifier included in one of the first or second requests.

3. The method of claim 1, wherein the first or second instructions include information identifying resource requirements associated with respectively the first or second communications channel.

4. The method of claim 3, wherein the first or second request is a request for executing a particular state of the interaction site.

5. The method of claim 3, wherein the instructions of the interaction flow document include XML scripts that correspond to pages of the interaction site.

6. The method of claim 1, wherein the interaction flow document is for controlling interaction between the user device and an interaction site.

7. The method of claim 6, wherein the interaction flow document is for engaging in an interactive voice response (IVR) interaction with a user of the user device, or for engaging in non-voice interaction with a user of the user device.

8. The method of claim 1, wherein the instructions of the interaction flow document are in a first scripting language, and the first instructions are in a second, different scripting language.

9. The method of claim 1, wherein at least one of the first or second communications channels include at least one of a SMS channel, a chat channel, or an email channel.

10. A system comprising:
a processor; and
memory, wherein the memory has stored therein instructions that, when executed by the processor, cause the processor to:
receive a first interaction request via a first communications channel for engaging in a first communication with a user device;
retrieve an interaction flow document in response to the first interaction request, the interaction flow document including instructions for processing interactions over a plurality of different communications channels;
translate the instructions of the retrieved interaction flow document to first instructions compatible with the first communications channel;
execute the first instructions for engaging in communication with the user device over the first communications channel;
receive a second interaction request via a second communications channel, the second communications channel being different from the first communications channel;
retrieve the interaction flow document in response to the second request;
translate the instructions of the retrieved interaction flow document to second instructions compatible with the second communications channel; and
execute the second instructions for engaging in communication with the user device over the second communications channel.

11. The system of claim 10, wherein the instructions further cause the processor to determine at least one of the first or second communications channel based on an identifier included in one of the first or second requests.

12. The system of claim 10, wherein the first or second instructions include information identifying resource requirements associated with respectively the first or second communications channel.

13. The system of claim 12, wherein the first or second request is a request for executing a particular state of the interaction site.

14. The system of claim 12, wherein the instructions of the interaction flow document include XML scripts that correspond to pages of the interaction site.

15. The system of claim 10, wherein the interaction flow document is for controlling interaction between the user device and an interaction site.

16. The system of claim 15, wherein the interaction flow document is for engaging in an interactive voice response (IVR) interaction with a user of the user device, or for engaging in non-voice interaction with a user of the user device.

17. The system of claim 10, wherein the instructions of the interaction flow document are in a first scripting language, and the first instructions are in a second, different scripting language.

18. The system of claim 10, wherein at least one of the first or second communications channels include at least one of a SMS channel, a chat channel, or an email channel.

* * * * *